US010152712B2

(12) United States Patent
Schimpf et al.

(10) Patent No.: US 10,152,712 B2
(45) Date of Patent: Dec. 11, 2018

(54) INSPECTING EVENT INDICATORS

(75) Inventors: Brian C. Schimpf, Harvard, MA (US); Edith H. Stern, Yorktown Heights, NY (US); Robert C. Weir, Westford, MA (US); Barry E. Willner, Briarcliff Manor, NY (US)

(73) Assignee: PAYPAL, INC., San Jose, CA (US)

( * ) Notice: Subject to any disclaimer, the term of this patent is extended or adjusted under 35 U.S.C. 154(b) by 2887 days.

(21) Appl. No.: 11/431,380

(22) Filed: May 10, 2006

(65) Prior Publication Data
US 2007/0265807 A1    Nov. 15, 2007

(51) Int. Cl.
*G06Q 20/40*    (2012.01)
*G06Q 20/10*    (2012.01)
*G06Q 20/20*    (2012.01)
*G06Q 40/02*    (2012.01)
*G07F 7/10*    (2006.01)

(52) U.S. Cl.
CPC .............. *G06Q 20/40* (2013.01); *G06Q 20/10* (2013.01); *G06Q 20/105* (2013.01); *G06Q 20/20* (2013.01); *G06Q 20/4016* (2013.01); *G06Q 40/02* (2013.01); *G07F 7/1016* (2013.01)

(58) Field of Classification Search
CPC ........ G06Q 20/20; G06Q 20/40; G06Q 20/10; G06Q 20/04; G06Q 20/105; G07F 7/1008; G07F 7/1016
USPC ................................................ 705/1, 50–500
See application file for complete search history.

(56) References Cited

U.S. PATENT DOCUMENTS

| | | | |
|---|---|---|---|
| 5,590,197 A * | 12/1996 | Chen | G06Q 20/04 380/30 |
| 5,613,004 A | 3/1997 | Cooperman et al. | |
| 5,796,989 A | 8/1998 | Morley et al. | |
| 5,982,293 A | 11/1999 | Everett et al. | |
| 6,006,200 A | 12/1999 | Boies et al. | |
| 6,064,990 A | 5/2000 | Goldsmith | |
| 6,163,771 A * | 12/2000 | Walker | G06Q 20/04 705/18 |
| 6,401,239 B1 * | 6/2002 | Miron | 707/203 |
| 6,422,462 B1 | 7/2002 | Cohen | |
| 6,446,052 B1 | 9/2002 | Juels | |

(Continued)

OTHER PUBLICATIONS

Hao Fu; Final Office Action in U.S. Appl. No. 11/431,383; dated Nov. 13, 2008; U.S. Patent and Trademark Office; Alexandria VA.

(Continued)

*Primary Examiner* — Calvin L Hewitt, II
*Assistant Examiner* — Sima Asgari
(74) *Attorney, Agent, or Firm* — Haynes and Boone, LLP

(57) ABSTRACT

A user inspects at least one indicator of an event. The user enables a token corresponding to an account of an aggregating entity to be received by a transaction entity and identifies at least one type of event of interest to be reported by the transaction entity to the aggregating entity. The user obtains and inspects at least one indicator from the account of the aggregating entity, where each obtained indicator is adapted to be created by the aggregating entity based upon an event message received from the transaction entity. The event message comprises the token, which is adapted to be used by the aggregating entity to identify the account and the event message corresponds to an occurrence of an event of at least one type of event of interest to be reported by the transaction entity to the aggregating entity.

16 Claims, 9 Drawing Sheets

(56) References Cited

U.S. PATENT DOCUMENTS

| | | | |
|---|---|---|---|
| 6,595,342 B1 | 7/2003 | Maritzen et al. | |
| 6,732,103 B1* | 5/2004 | Strick et al. | 707/10 |
| 6,871,220 B1 | 3/2005 | Rajan et al. | |
| 6,938,022 B1 | 8/2005 | Singhal | |
| 7,010,512 B1* | 3/2006 | Gillin | G06Q 20/04 705/35 |
| 7,383,212 B1* | 6/2008 | Cleveland | G06Q 10/00 705/26.1 |
| 2001/0044787 A1 | 11/2001 | Shwartz et al. | |
| 2002/0002534 A1 | 1/2002 | Davis et al. | |
| 2002/0007330 A1 | 1/2002 | Kumar et al. | |
| 2002/0040337 A1 | 4/2002 | Kikuchi | |
| 2003/0028481 A1* | 2/2003 | Flitcroft | G06Q 20/00 705/39 |
| 2003/0041071 A1 | 2/2003 | Wakai et al. | |
| 2003/0046534 A1 | 3/2003 | Alldredge | |
| 2003/0158960 A1* | 8/2003 | Engberg | G06Q 20/02 709/237 |
| 2004/0002958 A1 | 1/2004 | Seshadri et al. | |
| 2004/0064387 A1 | 4/2004 | Clarke et al. | |
| 2004/0073621 A1 | 4/2004 | Sampson | |
| 2004/0088235 A1* | 5/2004 | Ziekle | G06Q 30/04 705/34 |
| 2004/0098313 A1 | 5/2004 | Agrawal et al. | |
| 2004/0172535 A1* | 9/2004 | Jakobsson | G06Q 20/341 713/168 |
| 2004/0258281 A1 | 12/2004 | Delgrosso et al. | |
| 2005/0131768 A1 | 6/2005 | Rodriguez et al. | |
| 2005/0149394 A1* | 7/2005 | Postrel | 705/14 |
| 2005/0199705 A1* | 9/2005 | Beck | G06Q 20/10 235/380 |
| 2005/0203885 A1 | 9/2005 | Chenevich et al. | |
| 2006/0015932 A1* | 1/2006 | Ballinger et al. | 726/9 |
| 2006/0036546 A1* | 2/2006 | Arcieri | G06Q 20/10 705/44 |
| 2006/0159269 A1* | 7/2006 | Braun | H04L 9/0833 380/277 |
| 2006/0167771 A1 | 7/2006 | Meldahl | |
| 2006/0167819 A1* | 7/2006 | Bhambri | G06Q 20/12 705/64 |
| 2006/0230071 A1 | 10/2006 | Kass et al. | |
| 2007/0112602 A1 | 5/2007 | Bellon et al. | |
| 2007/0135099 A1* | 6/2007 | Taylor et al. | 455/412.1 |
| 2007/0174448 A1 | 7/2007 | Ahuja et al. | |
| 2007/0256124 A1 | 11/2007 | Ih et al. | |

OTHER PUBLICATIONS

Lombardo, Carly; Account Aggregation: In the Loop; Accounting Technology; Apr. 2004; p. 23, 4 pages; vol. 20, Issue 3; Boston.

Kim, Steven; Office Action-Non-final Rejection in U.S. Appl. No. 11/431,382; dated Jan. 22, 2009; U.S. Patent and Trademark Office; Alexandria, VA.

Kim, Steven; Office Action-Final Rejection in U.S. Appl. No. 11/431,382; dated Aug. 4, 2009; U.S. Patent and Trademark Office; Alexandria, VA.

Ravetti, Dante; Office Action-Non-final Rejection in U.S. Appl. No. 11/431,381; dated Feb. 19, 2010; U.S. Patent and Trademark Office; Alexandria, VA.

Hao Fu; Office Action-Non-final Rejection in U.S. Appl. No. 11/431,383; dated Mar. 12, 2008; U.S. Patent and Trademark Office; Alexandria, VA.

Hao Fu; Office Action-Non-final Rejection after RCE in U.S. Appl. No. 11/431,383; dated Apr. 27, 2009; U.S. Patent and Trademark Office; Alexandria, VA.

Hao Fu; Office Action-Non-final Rejection in U.S. Appl. No. 11/431,383; dated Nov. 30, 2009; U.S. Patent and Trademark Office; Alexandria, VA.

Fu, Hao; Office Action-Final Rejection in U.S. Appl. No. 11/431,383; dated May 12, 2010; U.S. Patent and Trademark Office; Alexandria, VA.

U.S. Appl. No. 11/431,382, filed May 10, 2006, Schimpf et al. (pending application) entitled, Aggregating Event Indicators.

U.S. Appl. No. 11/431,381, filed May 10, 2006, Schimpf et al. (pending application) entitled, Communicating Event Messages Corresponding to Event Indicators.

U.S. Appl. No. 11/431,383, filed May 10, 2006, Schimpf et al. (pending application) entitled, Generating Event Messages Corresponding to Event Indicators.

Ravetti, Dante; Office Action-Final Rejection in U.S. Appl. No. 11/431,381; dated Aug. 12, 2010; U.S. Patent and Trademark Office; Alexandria, VA.

* cited by examiner

INSPECTING EVENT INDICATORS

BACKGROUND OF THE INVENTION

The present invention relates in general to computer methods, systems and computer program products for inspecting indicators of events that are derived from event messages that are generated by transaction entities.

Identity fraud is a crime in which a perpetrator obtains one or more key pieces of sensitive information about a victim, which may comprise an individual or an organizational entity. Exemplary sensitive information may include a Social Security number, driver's license number, tax identification number, password, account information, user identification codes, etc. The perpetrator utilizes the illicitly obtained sensitive information for nefarious purposes, e.g., to obtain false credentials, or to illegally obtain credit, merchandise, access to banking and brokerage accounts, and/or services that rightfully belong to the victim. Acts of identity fraud may be carried out by retrieving sensitive information that is stored in an unsecured manner remote from an individual or entity. Acts of identity fraud may also be carried out by intercepting the communication of sensitive information, e.g., by intercepting an electronic transmission that includes sensitive information.

Prior methods of identifying the occurrence of identity fraud could take weeks or months to recognize, making remediation of the theft difficult and time consuming to accomplish. For example, some credit card companies suggest that customers "self police" their accounts by periodically signing on to each credit card provider to manually verify the correctness of the reported transactions. This concept of self policing has at least two major drawbacks. One is that it requires people to periodically sign on to all of their accounts, which is time consuming, and therefore unlikely to be sustainable over time. This practice can also actually increase the risk of identity fraud. In order for a person to self police a number of accounts, the individual would have to access all of their accounts, typically by entering sensitive information such as their identification codes and passwords into a web site maintained by the creditor. An identity fraud perpetrator could observe or intercept this sensitive information either electronically or physically. For example, assets of the individual could be compromised in the event that the individual's computer system is infected with a virus that captures keystrokes and communicates those keystrokes to a source that uses the data to perpetrate identity fraud.

Current approaches for detection of fraud and identity theft also include the analysis of patterns, e.g., spending traits, in the accounts of customers. If a transaction is detected outside a determined pattern, the account owner is contacted to verify the validity of the transaction. One drawback to the pattern recognition approach is that it generates many false positives. It is anticipated that with an increasingly mobile society, it will continue to be difficult for automatic pattern analysis methods to catch a high percentage of criminal activity, without also triggering a concomitant high level of false alarms.

BRIEF SUMMARY OF THE INVENTION

The present invention provides a computer implemented method for inspecting at least one indicator of an event. The user enables a token corresponding to an account of an aggregating entity to be received by a transaction entity and identifies at least one type of event of interest to be reported by the transaction entity to the aggregating entity. The user then obtains and inspects at least one indicator from the account of the aggregating entity, where each obtained indicator is adapted to be created by the aggregating entity based upon an event message received from the transaction entity, where the event message comprises the token, which is adapted to be used by the aggregating entity to identify the account and the event message corresponds to an occurrence of an event of at least one type of event of interest to be reported by the transaction entity to the aggregating entity.

The present invention also provides a computer system to inspect at least one indicator of an event. The system comprises a module to enable a token corresponding to an account of an aggregating entity to be received by a transaction entity and a module to identify at least one type of event of interest to be reported by the transaction entity to the aggregating entity. The system further comprises a module to obtain at least one indicator from the account of the aggregating entity and a module to inspect each obtained indicator. Each obtained indicator is adapted to be created by the aggregating entity based upon an event message received from the transaction entity, where the event message comprises the token, which is adapted to be used by the aggregating entity to identify the account and the event message corresponds to an occurrence of an event of at least one type of event of interest to be reported by the transaction entity to the aggregating entity. The system is described by a plurality of modules, where each module may take the form of hardware, software or a combination of hardware and software. Moreover, a single physical structure may implement one or more described module. Exemplary hardware and software for implementing the modules may comprise a server, general purpose computer or other type of programmable processing device.

Still further, the present invention provides a computer program product comprising a computer usable medium having computer usable program code embodied therewith. The computer program product is provided to inspect at least one indicator of an event and comprises computer usable program code configured to enable a token corresponding to an account of an aggregating entity to be received by a transaction entity and computer usable program code configured to identify at least one type of event of interest to be reported by the transaction entity to the aggregating entity. The system further comprises computer usable program code configured to obtain at least one indicator from the account of the aggregating entity and computer usable program code configured to inspect each indicator. Each obtained indicator is adapted to be created by the aggregating entity based upon an event message received from the transaction entity, where the event message comprises the token, which is adapted to be used by the aggregating entity to identify the account and the event message corresponds to an occurrence of an event of at least one type of event of interest to be reported by the transaction entity to the aggregating entity.

In the method, system and computer program product, the user may enable the token to be received by a corresponding transaction entity by obtaining at least one token from either the aggregating entity or a third party, and distributing at least one token to the transaction entity. Alternatively, the user may allow the transaction entity to receive at least one token from either the aggregating entity or a third party, e.g., by providing information to the transaction entity that allows the transaction entity to contact the aggregating entity to request one or more tokens. Still further, the user may generate at least one token based upon information received from the aggregating entity and distributing at least one token to the transaction entity.

BRIEF DESCRIPTION OF THE SEVERAL VIEWS OF THE DRAWINGS

The following detailed description of the preferred embodiments of various embodiments of the present invention can be best understood when read in conjunction with the following drawings, where like structure is indicated with like reference numerals, and in which.

DETAILED DESCRIPTION OF THE INVENTION

Figure 1:
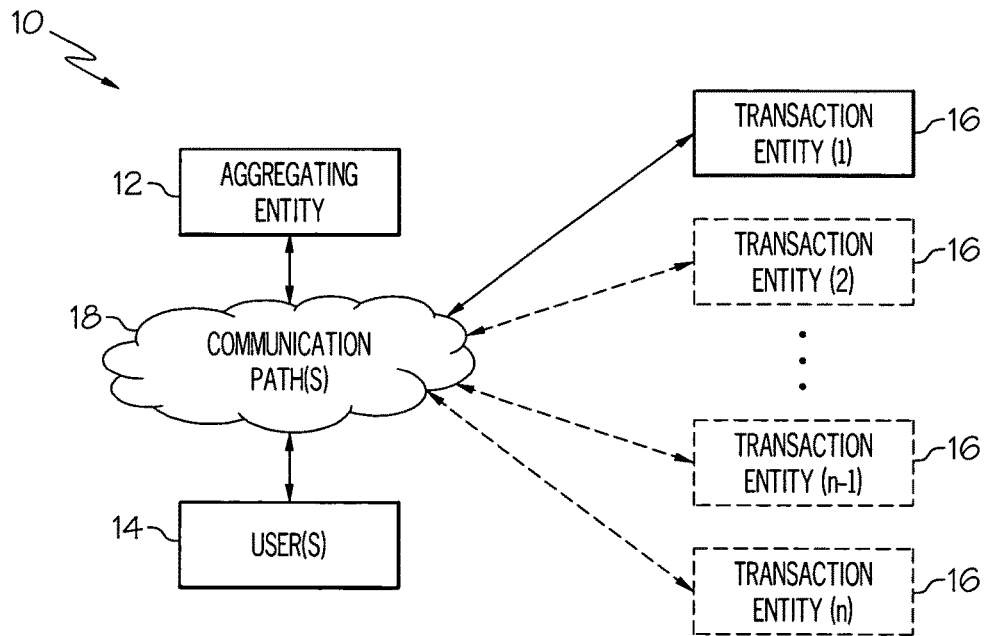
FIG. 1 is a system diagram illustrating a system for monitoring transactions.

As will be appreciated by one skilled in the art, the present invention may be embodied as a method, computer system, or computer program product. Accordingly, the present invention may take the form of an entirely hardware embodiment, an entirely software embodiment (including firmware, resident software, micro-code, etc.) or an embodiment combining software and hardware, wherein the embodiment or aspects thereof, may be generally referred to herein as a "circuit," "module" or "system." Furthermore, the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate, propagate, or transport the program for use by or in connection with an instruction execution system of a corresponding processing device. The various computer program product embodiments of the present invention may be stored together or distributed, either spatially or temporally across one or more devices. A computer-usable or computer-readable medium may be, for example but not limited to, an electronic, magnetic, optical, electromagnetic, infrared, or semiconductor system, apparatus, device, or propagation medium.

More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. The computer usable program code may be transmitted using any appropriate medium, including but not limited to the Internet, wireline, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single computer or on one or more different computers such as one or more remote computers or servers. In the latter scenario, computers may be connected through a local area network (LAN) or a wide area network (WAN), or the connection may be made, for example, through the Internet using an Internet Service Provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

General System Overview

With reference now to the drawings, and in particular to FIG. 1, a system 10 comprises an aggregating entity 12, at least one user 14, and one or more transaction entities 16 associated with each user 14. Communications between the aggregating entity 12, user(s) 14 and the associated transaction entity or entities 16 is carried out across one or more communications paths 18.

The aggregating entity 12 is an information collection service for each of its users 14. In general, the aggregating entity 12 provides one or more accounts and associates one or more tokens with each account. Each account and corresponding token(s) are further associated with a user 14. The token(s) associated with an account are adapted to be distributed to at least one transaction entity 16 that is associated with the user 14 of the corresponding account as will be described in greater detail herein.

The aggregating entity 12 receives event messages, where each received event message comprises a previously distributed token that uniquely identifies a particular account maintained by the aggregating entity 12, and which is associated with an event of interest to an associated user 14 of that particular account. Each received event message may also contain information, such as a description of the event of interest, in addition to the corresponding token as will be described in greater detail below. In response to receiving an event message, the aggregating entity 12 identifies a corresponding account based upon the token included with that event message. The aggregating entity 12 further associates at least one indicator of the event of interest to the user 14 with the account based upon the received event message and aggregates those indicator(s) with any indicators previously associated with the identified account. The aggregating entity 12 also makes the aggregated indicators in an account available to the corresponding user 14 as will be described in greater detail herein.

By the terms "aggregates", "aggregating" or "aggregated", it is meant that the indicators that are created by the aggregating entity 12 are collected, gathered, deposited, stored, commingled, or otherwise linked or associated with the corresponding account.

Each event indicator that is aggregated into an account by the aggregating entity 12 identifies the occurrence of one or more events of interest to the corresponding user 14 associated with that account. In this regard, events may be positive actions, such as a deposit into a bank account, a successfully completed stock trade, a credit card use, etc. An event may also comprise a negative action or omission of an anticipated action, such as a failure of a bank to receive a payment, a refusal to accept a charge, failure to purchase a stock because the current stock price exceeded some predetermined threshold, etc. Regardless, each indicator contains sufficient information to allow the corresponding user 14 to at least identify that the associated event has occurred. Moreover, the indicators may be void of sensitive information as will be described in greater detail herein.

The aggregating entity 12 may associate an indicator with a corresponding account based upon the received event message by creating an indicator, e.g., in the form of a record, that is deposited, stored or otherwise recorded in the corresponding account. The indicator may be created by extracting, deriving or otherwise manipulating information from the content of the received event message, by generating, creating or otherwise inferring information based upon the received event message or a combination thereof.

In a first exemplary case, the aggregating entity 12 creates an indicator comprising information that is extracted, derived or otherwise manipulated from a description of an event of interest that is provided as part of a received event message, where the description is separate and distinct from the corresponding token. For example, a transaction entity 16 may generate an event message including a description of an event of interest to the corresponding user 14, such as "Deposit Made", along with a corresponding token. In this case, an associated indicator may include the extracted description "Deposit Made" from the corresponding event message, with or without additional information, such as a time stamp or a reference to the corresponding value of the token from the associated event message.

In a second exemplary case, the aggregating entity 12 creates an indicator comprising information that is generated, created or otherwise inferred from a received event message. For example, the event message may include a token where the token itself defines information corresponding to an indicator of an event of interest to the corresponding user 14. That is, the user 14 infers the occurrence of an event of interest based upon an indicator that identifies receipt of that token. In this case, there is no event description provided with the associated event message. Moreover, the indicator is created by generating or otherwise creating information that references the token received with the associated event message. However, no explicit description of the event need be provided as part of the indicator.

In a third exemplary case, the aggregating entity 12 again creates an indicator comprising information that is generated, created or otherwise inferred from a received event message. For example, an event message may include a token where the value of the token defines information corresponding to an indicator of an event of interest to a corresponding user 14. As with the second exemplary case, there is no event description provided with the associated event message. However, the third exemplary case differs from the second exemplary case at least in that the indicator created by the aggregating entity 12 comprises information such as a description of an event of interest, which is generated, created or otherwise inferred from the token or other information received with the associated event message. For example, the aggregating entity 12 may be instructed by a user 14 to aggregate an indicator including the description "Credit card transaction" each time an event message is received with a token having a particular value. Each of the above exemplary cases will be described along with examples in greater detail herein.

Each user 14 may comprise an individual user, such as a consumer, or an organizational entity, such as a corporation, a for-profit or not for-profit business concern, partnership, association, club, professional organization, government entity, agency or other entity that wishes to monitor events. For example, the user 14 may be an individual that is utilizing the aggregating entity 12 as a personal policing service to monitor and detect identity fraud. The user 14 may also be interested in confirming one or more events such as for the occurrence (or omission) of a specific transaction. As another example, a user 14 may comprise a business concern seeking to monitor the transactions of employees, etc.

Transaction entities 16 are those entities that generate and transmit event messages to the aggregating entity 12. Transaction entities 16 may trigger or recognize the occurrence of events associated with a user 14, and may conduct transactions or otherwise participate in acts that are to be monitored, policed, tracked, verified, etc., by the associated user 14. Transaction entities 16 can transact directly or indirectly with the associated user 14, on behalf of or for the benefit of the associated user 14, or otherwise recognize events that affect or somehow relate to the associated user 14. Exemplary transaction entities 16 may include banks, lending institutions, credit card companies and other creditors, brokerage firms, retail stores, insurance providers, credit reporting providers, government entities, other service providers, periodic subscription services such as Internet providers, telephone and cellular phone services, utilities or other goods or service entities. Where the user 14 comprises an organizational entity, an exemplary associated transaction entity 16 may further include a supplier, a reseller, a distributor, a customer, an internal division, branch or other organizational aspect within the structure or outside the structure of the entity.

The system 10 comprises a plurality of hardware and/or software processing devices for interfacing with operator(s) of the system 10 and for implementing the various functions of the aggregating entity 12, the user(s) 14 and corresponding transaction entity or entities 16. The processing devices are linked together by the network communications path(s) 18. Typical processing devices may include servers, personal computers, notebook computers, transactional systems, appliance or pervasive computing devices such as a personal data assistants (PDA), palm computers, cellular access processing devices, special purpose computing devices, printing and imaging devices, telephone and facsimile devices, storage devices and/or other devices capable of communicating over the communications path 18. The processing devices may also comprise software, including applications that interact with various databases, spreadsheets, structured documents, unstructured documents and/or other files containing information.

Thus, the communications path 18 may comprise any path or paths that allow information to be communicated between the processing devices of the aggregating entity 12, each user 14 and the associated transaction entity or entities 16. For example, the communications path(s) 18 may provide communications links between the various processing devices and may be supported by networking components that interconnect the processing devices of the aggregating entity 12, the user(s) 14 and corresponding transaction entity or entities 16 such as, routers, hubs, firewalls, network interfaces wired or wireless communications links and corresponding interconnections. Moreover, the communications path(s) 18 may comprise connections using one or more intranets, extranets, local area networks (LAN), wide area networks (WAN), wireless networks (WIFI), the Internet, including the world wide web, telephone connections and/or other arrangements for enabling communication between the processing devices and/or operators of the system 10 in either real time or otherwise, e.g., via time shifting, batch processing, etc.

As noted above, the indicators of events of interest may be void of sensitive information. The term "sensitive information" includes information that a user 14 and/or corresponding transaction entity 16 does not want to publicly divulge or otherwise make generally known. As such, that which is considered "sensitive information" will vary depending upon the application, the tolerance of the user 14, the tolerance of the transaction entity 16, the nature of the events being monitored and other similar types of factors. For example, sensitive information may be any information that can be used to compromise the security and/or confidentiality of either the user 14 and/or the corresponding participating transaction entity 16, such as the names of transaction parties, contact information, account numbers, passwords, account balances, transaction amounts, etc. As a further example, it may be that the nature of the event itself is considered sensitive information. Other times, the nature of the transaction, amount of the transaction etc., may be considered mundane and thus is not sensitive information.

Still further, sensitive information may comprise information that a company wishes to maintain confidential, such as records dealing with financial matters including sales, pricing and profit/loss earning information, manufacturing, research and development and/or customer databases. Sensitive information may also include medical information, academic information, and/or tax information or other government related information.

Thus, whether or not information is deemed sensitive information may be dependent upon the particular application and the perceived threat or the likelihood that such information may be impermissibly obtained and used for reasons other than those approved of by the users 14 and corresponding transaction entity 16. Moreover, the determination of what constitutes sensitive information may vary on an event by event basis, even with the same transaction entity 16.

The level of security desired by a user 14 may determine the amount of information that is shared between the parties, including the aggregating entity 12, the user 14 and associated transaction entity or entities 16. For example, there may be at least some level of anonymity between any two or more of the parties. Anonymity may be implemented by using levels of indirection to disguise or conceal the identity of the parties, e.g., by using an agent, proxy, intermediate or other layer of separation between the aggregating entity 12 and the user 14, the aggregating entity 12 and one or more transaction entities 16 and/or a user 14 and one or more corresponding transaction entities 16. On the other hand, some amount of information may be shared between the parties. For example, one or more of the transaction entities 16 may be identified to the aggregating entity 12 for exchanging a security credential or other identity validating requirement.

The Aggregation of Indicators Based Upon Event Messages

Figure 2:
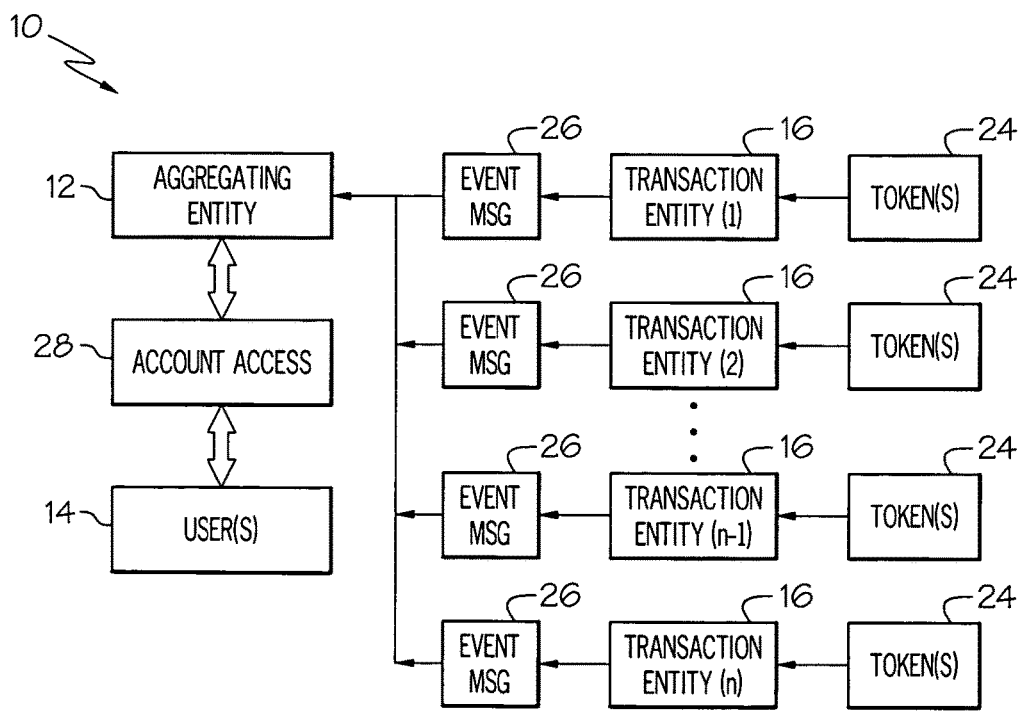
FIG. 2 is a system diagram illustrating the flow of information from a plurality of transaction entities to an aggregating entity, and the flow of information between the aggregating entity and a user.

With reference to FIG. 2, an exemplary system 10 is illustrated in block diagram form from the perspective of a single user 14. However, the discussion with reference to FIG. 2 can be expanded out to any number of users 14. For each user 14, at least one token 24 is distributed to at least one transaction entity 16 where each distributed token 24 uniquely identifies a particular account maintained by the aggregating entity 12 which is associated with the user 14. As shown in the illustrative example of FIG. 2, there are a total of n transaction entities 16, each associated with the same user 14.

The value of each distributed token 24 may be the same for each transaction entity 16. Alternatively, the value of two or more distributed tokens 24 may be different. By having different token values, it is meant that two or more tokens 24 are different in some discernable manner. However, each of the different tokens 24 is associated with the same account corresponding to the associated user 14. Each transaction entity 16 may receive one or more tokens 24 of the same or different value. Thus, each transaction entity 16 may independently receive one or more tokens 24, where each token 24 may have the same or a different value.

Where more than one token value is associated with a particular account of the aggregating entity 12, the tokens 24 may be generated at the same time, or the tokens 24 may be generated at different times, e.g., where a user 14 initially distributes one or more tokens 24, then at a later time requests additional tokens 24, which may be of the same or different value.

For each transaction entity 16 associated with a user 14, one or more types of events are identified. The event types are typically identified by the user 14, the corresponding transaction entity 16 or in part by both the user 14 and the corresponding transaction entity 16. However, the aggregating entity 12 may also identify one or more event types, e.g., by identifying event types that are generic to various transaction entities 16. An event type characterizes a class of events that triggers a corresponding transaction entity 16 to generate an event message 26. When an event occurs of one of the identified event types, the corresponding transaction entity 16 transmits an event message 26 to the aggregating entity 12. The event message 26 includes a copy of a token 24, which allows the aggregating entity 12 to associate the incoming event message 26 with a corresponding account associated with the user 14. The event message 26 may also include information separate from the token 24 corresponding to one or more indicators of events of interest to an associated user 14.

Each transaction entity 16 will likely send different event messages 26 based upon different predefined event types. For example, a transaction entity 16 such as a bank may send event messages 26 upon the occurrence of events corresponding to event types such as withdrawals and deposits into the user's account or accounts with the bank. As another example, a transaction entity 16 such as a brokerage firm may send event messages 26 upon the occurrence of events corresponding to event types such as the sale or purchase of stocks, when the share price of a particular stock falls above or below a predetermined threshold, etc. Thus, the aggregating entity 12 may be used to provide a single account where a variety of event indicators generated from event messages 26 from multiple transaction entities 16 can be aggregated.

A user 14 may then obtain, view, inspect etc., the aggregated indicators of events that were associated with a corresponding account via a suitable account access 28. The account access 28 may comprise a network based connection, such as a connection over the Internet, a telephone connection or other form of communication that allows the user 14 to access the associated event indicators as will be explained in greater detail herein.

Figure 3:
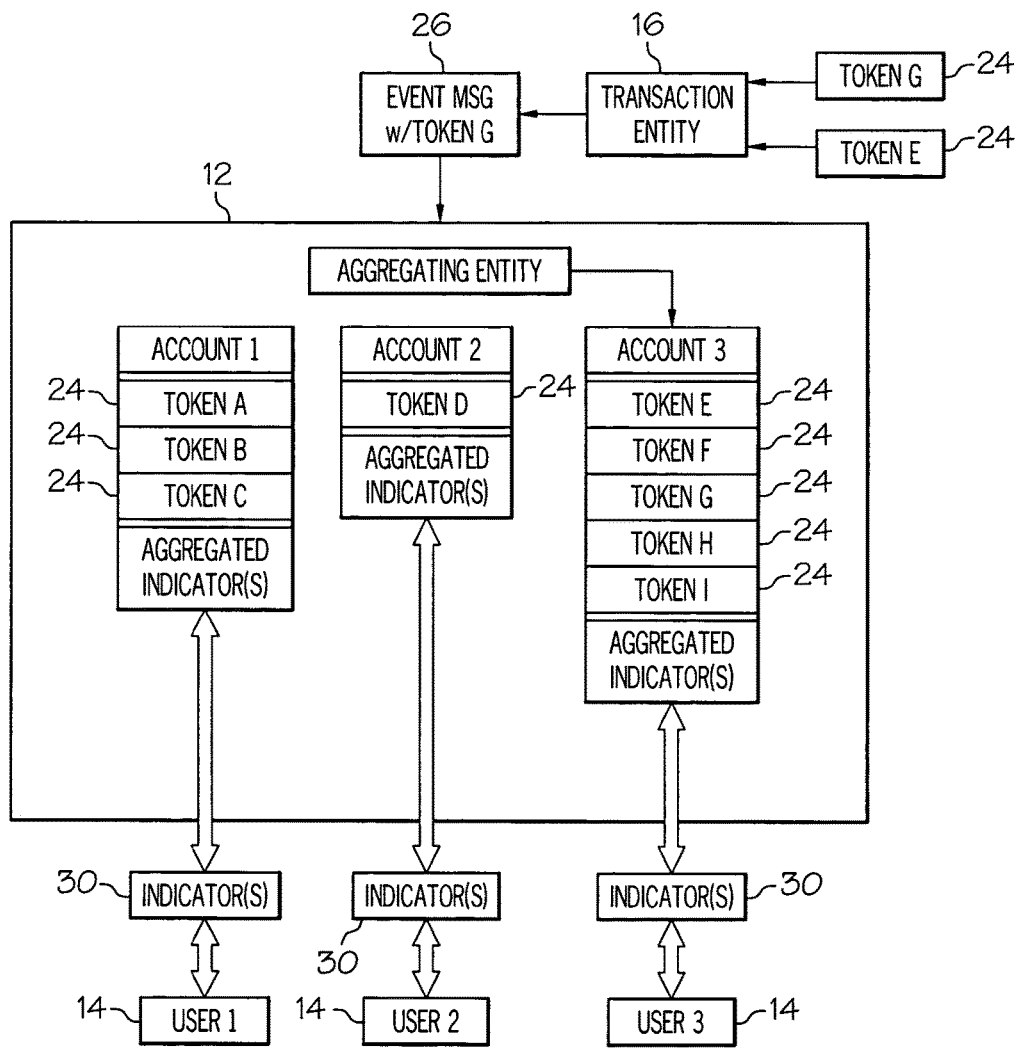
FIG. 3 is a diagram of an aggregating entity illustrating several exemplary accounts and associated token values.

With reference to FIG. 3, an exemplary system 10 illustrates several of the aspects described with reference to FIGS. 1 and 2 in greater detail. In the illustrated example, the aggregating entity 12 has three distinct accounts set up, including ACCOUNT 1, ACCOUNT 2 and ACCOUNT 3. By way of example, there are three tokens 24 that are each uniquely associated with ACCOUNT 1. The three tokens have unique token values, identified as TOKEN A, TOKEN B and TOKEN C. By "uniquely associated", it is meant that there is no ambiguity that needs to be resolved to associate a token 24 having a token value of TOKEN A, TOKEN B and TOKEN C to ACCOUNT 1. Other arrangements may alternatively be used to resolve a token 24 having a particular token value to its associated account. In this example, there is a single token 24 having a token value identified as TOKEN D, which is uniquely associated with ACCOUNT 2, and there are five different tokens 24, having token values identified as TOKEN E, TOKEN F, TOKEN G, TOKEN H and TOKEN I, which are each uniquely associated with ACCOUNT 3. In practice, the aggregating entity 12 can support any number of accounts, each account associated with one or more tokens 24.

Assume that a particular user 14, identified as USER 3, is associated with ACCOUNT 3 of the aggregating entity 12. USER 3 may be interested in monitoring events from one or more transaction entities 16. As such, one or more tokens 24 comprising any of the five token values TOKEN E, TOKEN F, TOKEN G, TOKEN H and TOKEN I may be distributed to each transaction entity 16 associated with USER 3. The tokens 24 can be divided up in any way desired by USER 3. For example, USER 3 may desire that every transaction entity 16 use the same token value, e.g., TOKEN E, for all event messages 26 sent to the aggregating entity 12. Under this arrangement, the remaining token values, i.e., TOKEN F, TOKEN G, TOKEN H and TOKEN I may be reserved for future use. Alternatively, if there are five transaction entities 16 associated with USER 3, each transaction entity 16 may utilize a unique one of the token values TOKEN E, TOKEN F, TOKEN G, TOKEN H and TOKEN I for each event message 26 sent to the aggregating entity 12.

Still further, one or more transaction entities 16 can receive multiple tokens 24, which may have different token values. For example, a transaction entity 16 such as a bank may use a token 24 having token value TOKEN H when sending event messages 26 to the aggregating entity 12 corresponding to deposits and a token 24 having a token value TOKEN I when sending event messages 26 to the aggregating entity 12 corresponding to withdrawals. The above examples of distributing tokens 24 to various transaction entities 16 is meant by way of illustration and not by way of limitation of the use of tokens 24. Several additional exemplary approaches to the use of tokens 24 are described in greater detail herein.

As shown in FIG. 3, a transaction entity 16 sends an event message 26 to the aggregating entity 12 that includes a copy of a token having the token value TOKEN G. Only one token 24 is sent in the illustrated event message 26, although the transaction entity 16 also holds at least one more token 24 of a different value, e.g., TOKEN E. In response to receiving the illustrated event message 26, the aggregating entity 12 identifies the account based upon the token 24 received with said event message 26. In the illustrated case, the aggregating entity 12 matches up TOKEN G with ACCOUNT 3. The aggregating entity 12 further associates at least one indicator of an event of interest to a user with the account, ACCOUNT 3 in the present example, based upon the event message. A user 14 having the necessary permission to access ACCOUNT 3, e.g., USER 3, can examine the event indicator(s) 30 corresponding to the received event message 26, as well as examine other event indicators 30 that have been previously aggregated in ACCOUNT 3.

Figure 4:
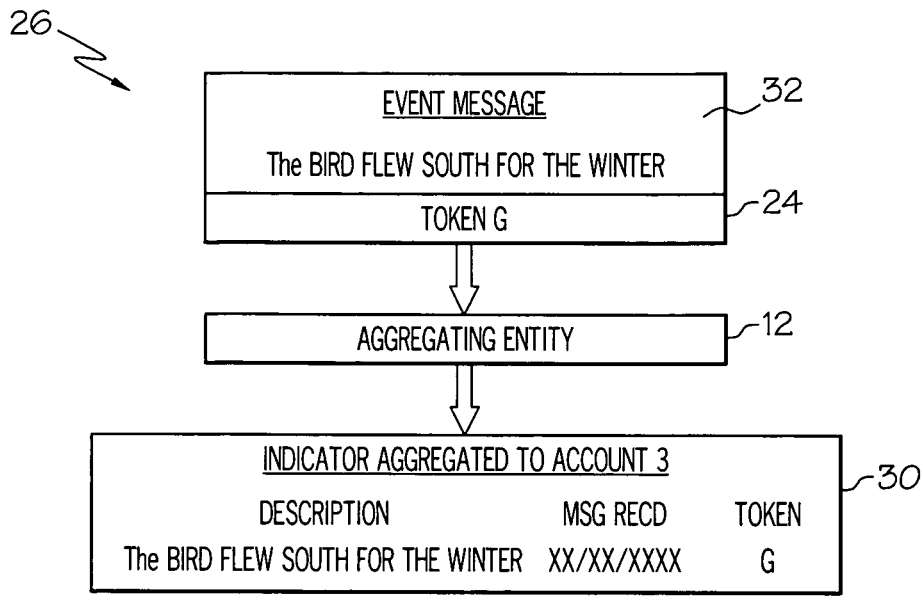
FIG. 4 is a first exemplary event message sent by a transaction entity and a corresponding indicator where a description of an event of interest is provided in the event message separate from the token.
Figure 5:
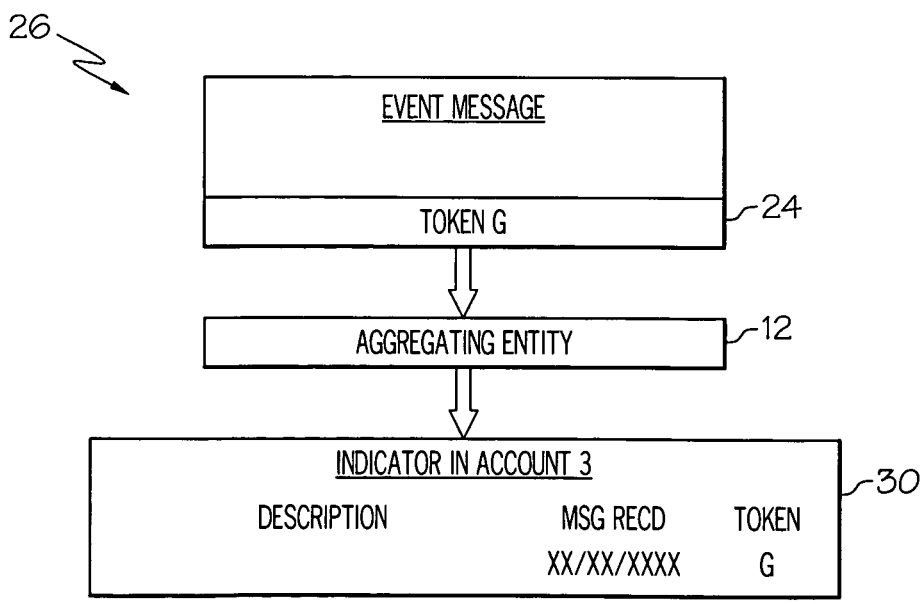
FIG. 5 is a second exemplary event message sent by a transaction entity and a corresponding indicator where the event of interest is inferred from receipt by the aggregating entity of the token itself.
Figure 6:
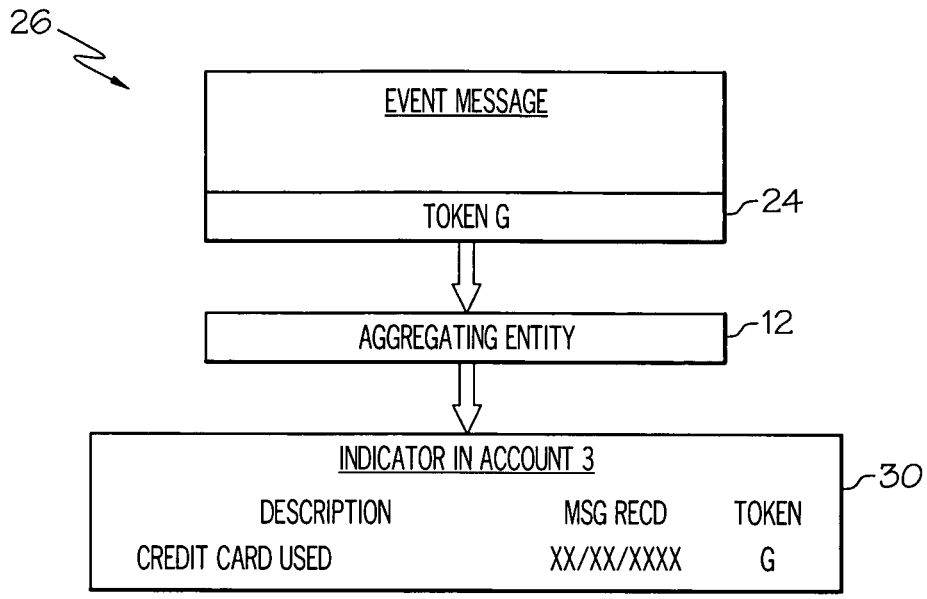
FIG. 6 is a third exemplary event message sent by a transaction entity and a corresponding indicator where the indicator is derived by the aggregating entity based upon the value of the token.

With reference to FIG. 4-6, several exemplary event messages 26 and corresponding indicators 30 are illustrated. In FIG. 4, a first exemplary event message 26 includes a token 24 having a token value of TOKEN G. The event message 26 further includes information such as a description 32 of an event of interest to the user. As shown, a personalized description 32 "The BIRD FLEW SOUTH FOR THE WINTER" is provided. The personalized description is a description which has specific significance to the user 14. The use of personalized descriptions to identify the occurrence of events will be described in greater detail herein. The event message 26 is communicated from a transaction entity 16 to the aggregating entity 12.

The aggregating entity 12 associates the event message with a corresponding account, ACCOUNT 3 in the example of FIG. 3, based upon the value of the token 24, i.e., TOKEN G as shown. The aggregating entity 12 also associates an indicator of an event of interest to USER 3 with ACCOUNT 3 based upon the event message 26. In particular, the aggregating entity 12 associates, in this case extracts, the received description 32 and incorporates the extracted information into the indicator 30. As shown, the indicator 30 includes the description 32 as well as optional additional data, such a time stamp, e.g., the date that the message was received by the aggregating entity 12, a reference to the value of the token 24 that accompanied the corresponding event message 26, etc. Alternatively, the indicator 30 may also include further types of information such as flags to indicate whether a particular indicator has been viewed, other forms of time stamps, metadata or other information of interest to USER 3. The Aggregating entity 12 may also optionally modify the description 32 based upon a predefined rule, e.g., as determined by USER 3.

Still further, the event message 26 may include additional information along with the description 32, such as time stamps etc. Any additional information provided in the event message 26 may be extracted, manipulated, ignored or otherwise processed by the aggregating entity 12. Such additional information may or may not be incorporated into an associated indicator 30.

As a further example of an event message 26 containing information regarding an event of interest separate from the token 24 (not shown in FIG. 4), an event message 26 may be sent by a transaction entity 16 to the aggregating entity 12 including a token 24 having a token value, e.g., TOKEN B corresponding to ACCOUNT 1, as well as event information such as "Credit Card Purchase in Atlanta Ga.". In response to receiving the event message 26, the aggregating entity 12 identifies the account based upon the token 24 received with the event message 26. In this case, the aggregating entity 12 matches up TOKEN B with ACCOUNT 1. The aggregating entity 12 further associates at least one indicator with ACCOUNT 1. In the present example, the description "Credit Card Purchase in Atlanta Ga." is extracted from the event message 26 and is included in the associated indicator 30. The indicator 30 is then aggregated to ACCOUNT 1, with or without additional corresponding information such as time stamps, etc. as noted in greater detail in the example above.

It is also contemplated that a given account of the aggregating entity 12 may receive event messages 26 from the same or different transaction entities 16, where the event messages 26 include the same token value but may have different descriptions of events. For example, a plurality of event messages 26 may be sent to the aggregating entity 12 by a first transaction entity 16, e.g., a bank, where each event message 26 sent by the bank includes a token having a token value of TOKEN D and information corresponding to an event associated with bank account deposits, e.g., a description 32 such as "Deposit made" or withdrawals, which may include a description 32 such as "Withdrawal made". Also one or more event messages 26 may be sent by a second transaction entity 16, e.g., a credit card company, where each event message 26 sent by the credit card company includes a token 24 having a token value of TOKEN D and information corresponding to an event associated with credit card purchases, e.g., a description such as "Credit Card Purchase". Upon receiving such event messages 26, the aggregating entity 12 associates the value TOKEN D to ACCOUNT B, and aggregates one or more indicators 30 into ACCOUNT B corresponding to the descriptions 32 provided in each event message 26.

With reference to FIG. 5, a second exemplary event message 26 is shown. The event message 26 shown in FIG. 5 does not include a description of the event of interest. Rather, the token itself, regardless of its value, causes the aggregating entity to associate an indicator 30 of an event of interest to an appropriate user account, where the indicator does not include an explicit description of the event. As shown in FIG. 5, the event message 26 includes a token 24 having a token value of TOKEN G. The aggregating entity associates at least one indicator with ACCOUNT 3 based upon the event message. As noted previously, the indicator 30 does not include a description of the event, but the indicator 30 may include additional information, such as a reference to the corresponding token value (TOKEN G), the date that the event message 26 was received by the aggregating entity 12 or other information. USER 3 infers the occurrence of an event of interest based upon an indicator that identifies receipt of that token value, e.g., TOKEN G. For example, the user 14 may require that transaction entities 16 use a token 24 having a token value of TOKEN G only for a specific type of event, e.g., a sale of a number of shares of a specific stock. Thus, the corresponding user 14 infers that shares of that specific stock were sold each time the user 14 sees an indicator that identifies Token G.

As a further example where the token itself defines information corresponding to an indicator of an event of interest, assume that USER 1 from the example of FIG. 3 is a business, associated with ACCOUNT 1 that wishes to track each time an employee drives a company car on a particular toll road. Each time an employee in a company car passes a designated toll booth, an event message 26 is sent by the toll booth to the aggregating entity 12 containing a token 24 having the token value of TOKEN C with no corresponding description. The business, USER 1, infers that an employee has driven on that particular toll road for each indicator 30 that is aggregated to ACCOUNT 1 that includes an instance of the value TOKEN C.

As yet a further example, a user 14 may use the same token value to represent that a car payment was electronically debited from a predetermined bank account. The amount of each of these transactions may not change, thus the user 14 may only be interested in identifying the occurrence of the event. As such, when the car payment is automatically deducted from the predetermined bank account of the user 14, the associated transaction entity 16, e.g., a bank, sends an event message 26 to the aggregating entity 12 that comprises the predetermined value token 24. The user 14 can then see that the token 24 of the predetermined value was received by the aggregating entity 12 and know that there were sufficient funds in the bank account to cover the car payment. In this example, there is no communication of the account number of the car loan. There is also no information such as payment amount, payoff amount, bank identity, user identity, or any other information that may be determined to be sensitive information to either the user 14 or the corresponding transaction entity 16. Yet, the user 14 is provided with valuable information, an acknowledgement that the car payment was made.

With reference to FIG. 6, a third exemplary event message 26 is shown. The event message 26 shown in FIG. 6 does not include a description of the event of interest. However, in this case, the token value defines information corresponding to an indicator of an event of interest where the indicator includes an explicit description of the event. As shown, the event message 26 includes a copy of a token 24 having a token value of TOKEN G. The aggregating entity 12 associates at least one indicator 30 with ACCOUNT 3 based upon the event message 26. The indicator 30 includes a description of the event that is defined by the aggregating entity 12 based upon a recognition of the value of a particular token 24, e.g., TOKEN G. For example, the aggregating entity 12 may be instructed by the user 14 to generate an indicator 30 including the description "CREDIT CARD USED" each time an event message 26 is received with a token 24 having the token value of TOKEN G.

As a further example where the token value defines information corresponding to an indicator of an event of interest, using the example of FIG. 3, USER 1 may be a company that gives a company credit card to an employee that is required to travel on behalf of the company. The company may only permit an employee that travels on behalf of the company to commit charges to the company credit card at hotels and restaurants. Thus, the company identifies a token 24 having a token value of TOKEN C to correspond to possible inappropriate uses of a credit card. The transaction entity 16, i.e., the credit card company in this example, is instructed by USER 1 to send an event message 26 containing a token having a token value of TOKEN C for any charges against the credit card which are not food or hotel related charges.

If the employee uses the card at a retail store, the credit card company sends an event message to the aggregating entity 12 with a token 24 having the value of TOKEN C. The aggregating entity 12 is instructed by USER 1, to generate the indicator "Possible Inappropriate Card Usage" with any existing indicators in ACCOUNT 1 each time an event message 26 is received that includes TOKEN C. In this example, there may be an explanation of why the employee needed to make a charge at the retail store. As such, the company does not want the credit card company to deny the charge. Moreover, the company may not want the credit card company to know why they are interested in a particular event. However, the company now knows that it needs to investigate the charge made by the employee.

Hence, in accordance with the illustrated embodiments of the present invention, the transaction entities 16 function to push event messages 26 onto the aggregating entity 12, where each event message 26 comprises an account identifying token 24. As such, the aggregating entity 12 does not require or obtain any information as to the identity of the transaction entities 16 or the relationship between the transaction entities 16 and their associated user(s) 14. Moreover, the aggregating entity 12 receives either a token 24 alone or a token 24 together with event description and possibly other optional information, which may comprise non-sensitive information. Thus, the aggregating entity 12 is not exposed to any sensitive information regarding an event for which an event message 26 is received and for which a corresponding indicator is aggregated into a corresponding account.

User Account with the Aggregating Entity

Figure 7:
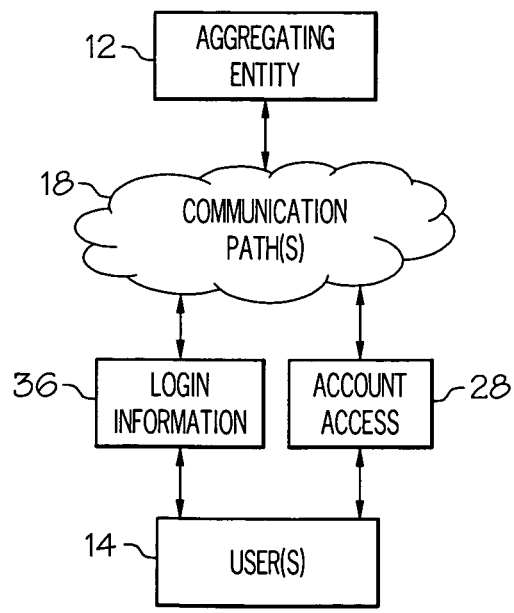
FIG. 7 is a system diagram illustrating the flow of information between a user and a corresponding aggregating entity.

With reference to FIG. 7, in order for the user 14 to obtain its account information, the aggregating entity 12 and the user 14 may agree upon desired user identification, which may include login information 36 such as a login identification name and optionally, an associated password. As another example, the aggregating entity 12 may either directly or indirectly provide the user 14 with a user identification, such as a login account number, code or other information which is associated with a corresponding account. Under this arrangement, the identity of the user 14 is not necessary to establish the account. Thus the user 14 can interact with the aggregating entity 12 anonymously.

According to one aspect of the present invention, the account access 28 comprises a connection over the Internet. In this exemplary arrangement, the aggregating entity 12 provides a web page. The user 14 uses a conventional web browser or other conventional software, or special software tools provided by the aggregating entity 12 to navigate to a web page of the aggregating entity 12 that prompts the user for login information. If the user 14 provides a valid user identification and optional user login password, the aggregating entity 12 allows the user 14 to search, query, sort, filter, view, inspect, review, print, download, delete and/or perform other monitoring and maintenance functions on the indicators 30 and other included information which are aggregated to the corresponding account.

The user 14 may also be able to set up preferences for the manipulation or display of the indicators 30. For example, user selected preferences may specify that the indicators 30 be ordered by time, filtered to include only new indicators 30 or to include indicators 30 received since a previous query. The indicators 30 may be sorted by token value, and in other useful manners.

One aspect of this approach is that the web page can serve as a portal for near real time monitoring of transactions. That is, the user 14 will not be required to wait for monthly statements to verify transactions.

Alternatively, the aggregating entity 12 may push data to the user 14, e.g., where the identity of the user 14 is not considered sensitive information or where some amount of personal information is provided to the aggregating entity 12, e.g., for purposes of receiving notices from the aggregating entity 12. In this embodiment, the account access 28 may comprise the aggregating entity 12 sending event indicator information or other notices via email, regular postal mail, telephone, facsimile, text messaging or by using other appropriate forms of communication.

One example of where some amount of personal information about each user 14 may be required by the aggregating entity 12 is where the aggregating entity 12 provides its services to users 14 based upon a subscription model. Under this arrangement, each user 14 may be required to communicate to the aggregating entity 12 a credit card number or some other form of payment for use of the aggregating service described more fully herein.

The Use of Tokens Associated with Accounts

According to at least one aspect of the present invention, the distribution of sensitive information such as account numbers, passwords, user identifications, etc., throughout one or more parts of the system 10 is mitigated, at least in part, by use of the token 24 incorporated into each event message 26 to identify an account of the aggregating entity 12. As noted above, the use and distribution of tokens 24 may take any number of forms. Some exemplary factors that may affect how tokens 24 are distributed may include the specific implementation of the system 10, the desired level of security and the specific manner in which the aggregating entity 12 offers its services to the various users 14.

Figure 8:
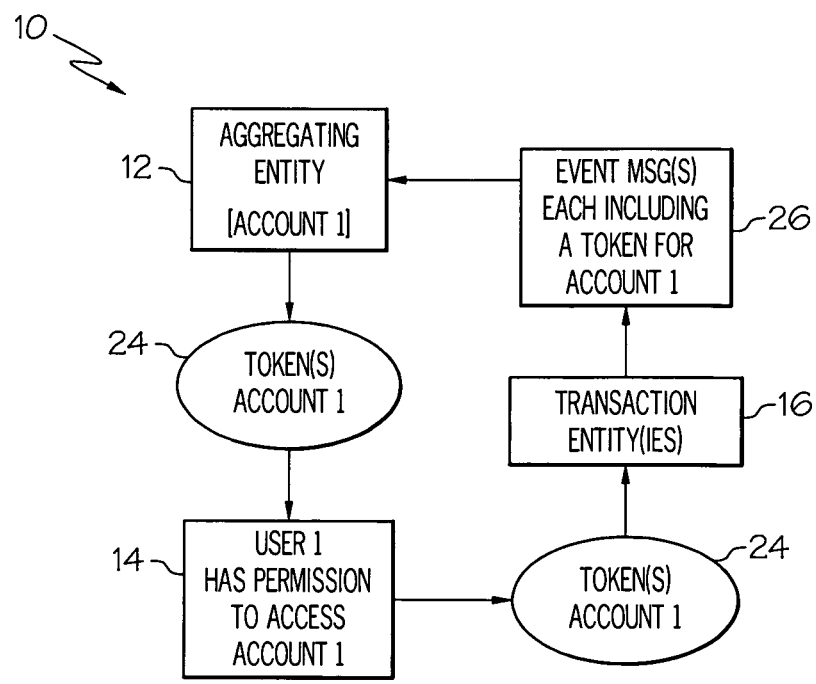
FIG. 8 is a system diagram illustrating the distribution of tokens from an aggregating entity to a user.

FIGS. 8-11 illustrate several exemplary approaches of distributing tokens 24 to the transaction entities 16. According to an aspect of the present invention, and with reference to FIG. 8, a user 14 is given control over the distribution of token(s) 24. Thus, the aggregating entity 12 is not required to have direct information as to the identities of the transaction entity or entities 16 who received the token(s) 24 from the user 14. Moreover, the aggregating entity 12 is not required to have direct information as to the value of a particular token 24 which was distributed by a user 14 to a corresponding transaction entity 16. As the example in FIG. 8 illustrates, the aggregating entity 12 establishes ACCOUNT 1 and provides one or more tokens 24 that are each associated with ACCOUNT 1 to USER 1, who has permission to access ACCOUNT 1. USER 1 provides one or more of the tokens associated with ACCOUNT 1 to one or more transaction entities 16. USER 1 also provides each transaction entity 16 with an address of the aggregating entity 12 for transmitting event messages 26.

Upon the occurrence of an event that is detected by a given transaction entity 16 and which is to be monitored by USER 1, the corresponding transaction entity 16 transmits an event message 26 to the aggregating entity 12. Each event message 26 includes a token 24 that is uniquely associated with ACCOUNT 1 and which was provided to the transaction entity 16 by USER 1. If a transaction entity 16 has been provided with a single token value associated with ACCOUNT 1, then each transmitted event message 26 from that transaction entity 16 that corresponds to an event associated with USER 1 will include that token value. If USER 1 provides multiple token values to a given transaction entity 16, which are each associated to ACCOUNT 1, then that transaction entity 16 may use a different token 24 for each corresponding event message 26, the transaction entity 16 may use the same token value for specific types of events, or the transaction entity 16 may use the tokens 24 in other ways.

For example, USER 1 may wish to provide a plurality of token values to each corresponding transaction entity 16 so that a unique token value is provided for each event message 26 received by the aggregating entity 12. This approach may be desirable to disguise the identity of the transaction entities 16. Since each event message 26 includes a unique token value that is associated with ACCOUNT 1, the specific token value itself cannot be used to deviously or mischievously determine the identity of the transaction entities 16 sending event messages 26 to the aggregating entity 12.

The use of unique token values for each event message 26 may also help prevent spoofing of the aggregating entity 12. If a common value token 24 is used by a transaction entity 16, and sending of event messages 26 from this transaction entity 16 to the aggregating entity 12 is not authenticated, the aggregating entity 12 can be spoofed if this token 24 is compromised. That is, if this token 24 gets in the hands of malicious third party, this third party can report transactions that never really happened to the aggregating entity 12. While no information is compromised by this action, it will be annoying, and may enable a denial of service attack on the aggregating entity 12 by reporting a vast number of bogus transactions. The requirement of a unique token 24 for each message 26 helps prevent the potential for spoofing. For example, the aggregating entity 12 may disregard an event message 26 that contains a token that has been previously used. Also, the aggregating entity 12 may inform either the corresponding user 14 or transaction entity 16 that a token value has been reused.

Figure 9:
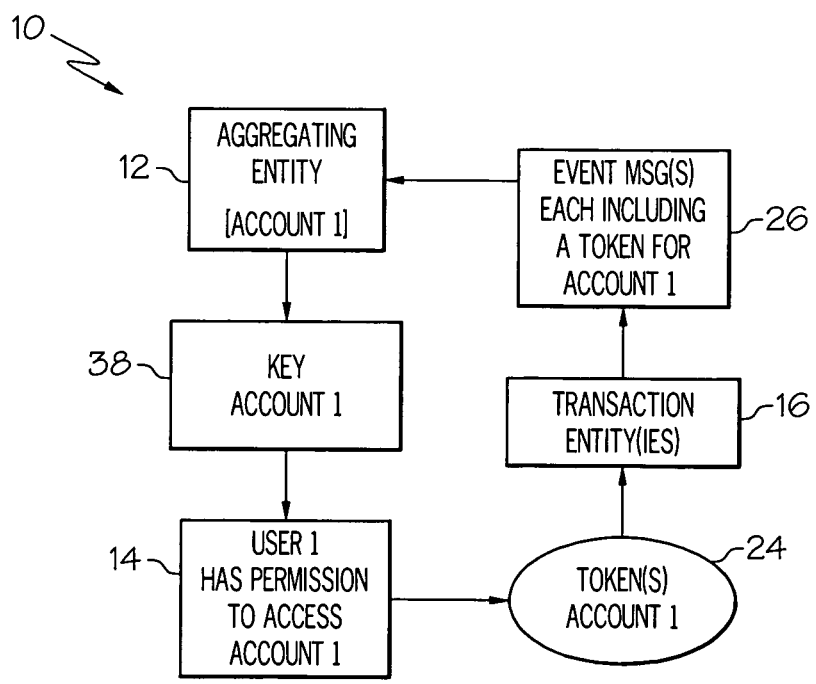
FIG. 9 is a system diagram illustrating the distribution of a key from an aggregating entity to a user so that the user can generate one or more tokens.

With reference to FIG. 9, another exemplary approach of distributing tokens 24 to the transaction entities 16 is illustrated. The system of FIG. 9 is similar to that described above with reference to FIG. 8. However, instead of the aggregating entity 12 providing the user 14 with one or more tokens 24, the aggregating entity 12 provides a user 14 with a key 38 that can be used by the user 14 to generate the tokens 24 that are distributed to the transactions entities 16 and that are each uniquely associated with ACCOUNT 1. For example, the key 38 provided by the aggregating entity 12 may comprise a semipublic key that can be used to generate the appropriate number of needed token values. The aggregating entity 12 maintains control over a private key counterpart of the semi-public key given to USER 1 that can distinguish any token generated by its associated semi-public key. Thus, the aggregating entity 12 uses its private keys, which are each associated with a corresponding account, to associate a received token 24 with its corresponding account. Further, the aggregating entity 12 may provide each user 14, e.g., USER 1 with software tools and/or other means for managing and keeping track of the generated and distributed tokens 24 generated by the semi-public key.

Figure 10:
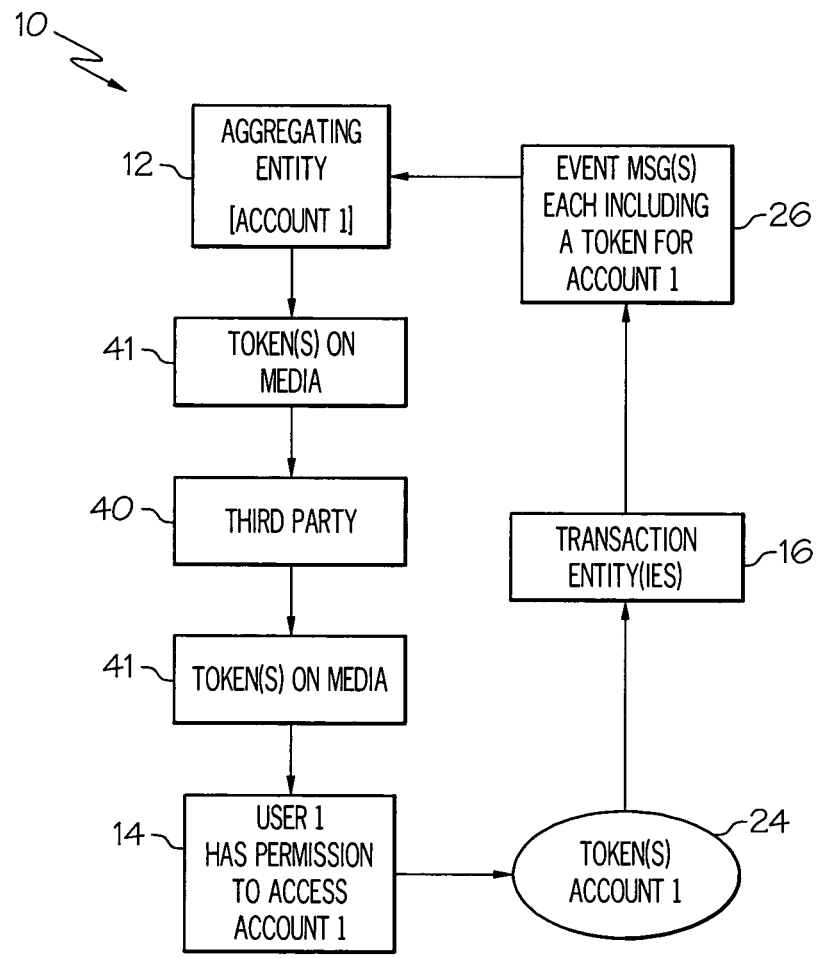
FIG. 10 is a system diagram illustrating the distribution of tokens from an aggregating entity to a third party and from the third party to a user.

With reference to FIG. 10, another exemplary approach is illustrated for distributing tokens 24 to transaction entities 16. The system of FIG. 10 is similar to that described above with reference to FIG. 8. However, instead of the aggregating entity 12 providing the user 14 with one or more tokens 24, the aggregating entity 12 may set up a plurality of accounts and generate one of more tokens 24 associated with each account. The tokens 24 are then distributed to an intermediary such as a third party 40. A user 14, e.g., USER 1 as shown, acquires the token(s) corresponding to one of the accounts, e.g., ACCOUNT 1 as shown, from the third party 40, and the user 14 distributes those tokens 24 to one or more transaction entities 16.

For example, the aggregating entity 12 can store the token(s) 24 corresponding to ACCOUNT 1 on a distributable media 41, such as a generally credit card sized media. The media 41 can then be sold at a retail store, specialty shop or other location where the media can be acquired or otherwise purchased by users 14. The media 41 may provide token(s) 24 that are valid for a limited time, a number of transactions, or provide other models for usage. Thus, the media 41 can serve as a pre-paid event collection card. The user 14, e.g., USER 1 provides one or more transaction entities 16 with one or more tokens 24 from the media card. The media card also provides the necessary information for USER 1 to obtain aggregated indicators from ACCOUNT 1 with the aggregating entity 12. The use of a media card is only exemplary of the manner in which tokens 24 can be distributed to the user 14 through an intermediary, such as a third party 40.

The use of a third party is an example of establishing a level of indirection between the user 14 and the aggregating entity 12. For example the aggregating entity 12 sets up the account and allocates one or more tokens 24 to that account without knowledge of who the user may be. The aggregating entity 12 also provides the necessary account login information, e.g., by including a pin number or other code on the media 41 along with the token(s) 24.

Figure 11:
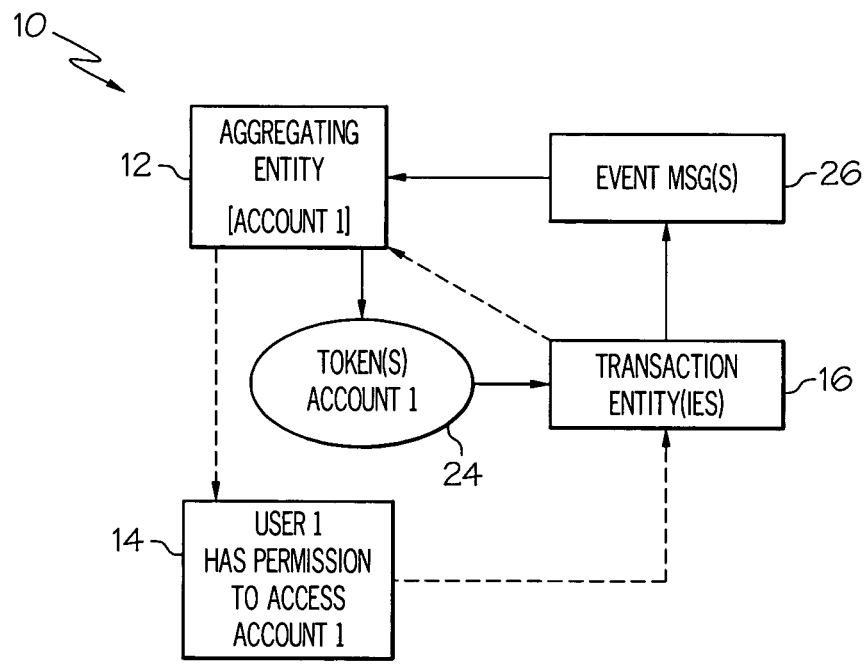
FIG. 11 is a system diagram illustrating the distribution of tokens from an aggregating entity to a transaction entity.

With reference to FIG. 11, another exemplary approach is illustrated for distributing tokens 24 to transaction entities 16. In the system of FIG. 11, the user 14 does not necessarily need to participate in the distribution of tokens 24. For example, the aggregating entity 12 may be able to provide tokens 24 directly or indirectly to one or more of the transaction entities 16, without direct involvement and on behalf of the corresponding user 14. A user 14 may provide the transaction entity 16 with contact information of the aggregating entity 12. The transaction entity 16 may then contact the aggregating entity 12 or a third party if levels of indirection are being implemented, and request one or more tokens 24 corresponding to an account of the associated user 14, e.g., USER 1. Alternatively, the aggregating entity 12 may obtain knowledge of a transaction entity 16, e.g., the corresponding user 14, and send tokens to that transaction entity 16.

Distribution of One or More Tokens

As noted above, a single token value may be associated with a given account of the aggregating entity 12. Thus, a copy of the same token 24 is provided to each transaction entity 16 for a given account of the aggregating entity 12. Under this arrangement, each generated event message 26 associated with a particular user 14 and corresponding account of the aggregating entity 12 will include a copy of the same value token 24, regardless of the transaction entity 16 that prepared and/or transmitted the event message 26 to the aggregating entity 12. Moreover, the token 24 will be duplicated and reused by each transaction entity 16 each time a new event message 26 is generated, regardless of the nature of the event being reported.

As also noted above, a different value token 24 may be provided to each transaction entity 16 where each different value token 24 is associated with the corresponding user 14 and account with the aggregating entity 12. Under this arrangement, each transaction entity 16 reuses its token 24 each time it sends a new event message 26 to the aggregating entity 12. Likewise, a single transaction entity 16 may receive multiple token values, and use a particular value token for a particular type or types of events. Thus a bank may generate event messages 26 that include a first token value for deposits and a second token value for withdrawals. Alternatively, the bank may generate event messages 26 that include a first token value for transactions at a first branch location and a second token value for transactions at a second branch location.

As yet another example, a different token value may be provided to each of one or more different logical groupings of transaction entities 16. Each transaction entity 16 within a given logical grouping uses the same token value each time an event message 26 is sent. Thus, for example, a user 14 may distribute a copy of a first token having a first value to all associated transaction entities 16 that are banks. The user 14 may further distribute a copy of a second token having a second value to all associated transaction entities 16 that are credit card companies, where the tokens of the first and second value are each associated with the same account at the aggregating entity 12.

As further noted above, each transaction entity 16 may be provided with a plurality of different valued or unique tokens 24 where each token is associated with a corresponding user 14 and account with the aggregating entity 12. As such, each event message 26 communicated to the aggregating entity 12 and which is associated with a given account includes a different value token 24. By using a different value token 24 for each event message 26, it may be difficult for any nefarious acts that attempt to discover the identity of the source transaction entity 16 based upon the token 24 itself. Other arrangements may also be used for distributing tokens 24.

Tokens

The tokens 24 can embody any form that allows the aggregating entity 12 to identify a corresponding account. The tokens 24 can thus comprise strings, keys, references, identifiers, codes and other representations. In one exemplary arrangement, each token 24 comprises a long string. For example, each token may comprise a 1024 bit string or other arbitrarily long length string. The use of a long string allows each token 24 to be sufficiently different from other tokens 24 to prevent the value of any particular token 24 from being guessed or associated with a user 14, a corresponding transaction entity 16 or the account of the aggregating entity 12. A database, table, list, array or other approach is used by the aggregating entity 12 to store a record of the value of each token 24 associated with a given account. Where multiple tokens 24 are associated to a given account, the aggregating entity 12 may store a record of each token value associated with a give account, or the aggregating entity 12 may allocate a block or range of values instead of storing a record of each specific value. As such, when an event message 26 is received by the aggregating entity 12, the aggregating entity 12 can match the received event message 26 to the correct user account by performing a search of the database to determine which user account includes a record of a matching string, or by identifying which account contains a token 24 having a value within a predefined range.

As an alternative, the aggregating entity may utilize cryptographic key pairs to generate tokens 24. This exemplary approach is similar to that described above with reference to FIG. 9, corresponding to the use of a semipublic key. However, in this example, one of the keys of the key pair is used as the token itself. For example, an asymmetric key pair may comprise a first and a second key. A first key defines a private key that is maintained by the aggregating entity 12. The second key is a public key that can be given out by a user 14 to corresponding transaction entities 16. Thus, the public key defines the token 24. There are a number of ways that the key pair can be used. Each transaction entity can use their associated public key to digitally sign each event message 26. When the aggregation entity 12 receives the event message 26, only the account having the corresponding private key will be able to verify the message and match with the digital signature. Alternatively, the public key may be transmitted with the event message 26 where the public key itself is the token 24.

User/Transaction Entity Interaction

The user 14 and a corresponding transaction entity 16 may identify desired information to be communicated in event messages 26 sent by the transaction entity 16 to the aggregating entity 12 based upon the identified event types. Communication of information between the user 14 and a corresponding transaction entity 16 may be accomplished over the Internet, by email, regular mail, telephone, in person contact, etc.

The Event Message

The event message 26 is transmitted by a transaction entity 16 to the aggregating entity 12 upon the detection by the transaction entity 16 of the occurrence of an event of interest to the corresponding user 14. In general, the information corresponding to an indicator 30 that is provided in an event message 26 may not include sensitive information. Where information comprises a description of an event of interest to the user, e.g., as discussed above with reference to FIG. 4, the description may be chosen to contain text that does not violate some predetermined security, which may be established between the user 14, the corresponding transaction entity 16, the aggregating entity 12, or any combination thereof.

Figure 12:
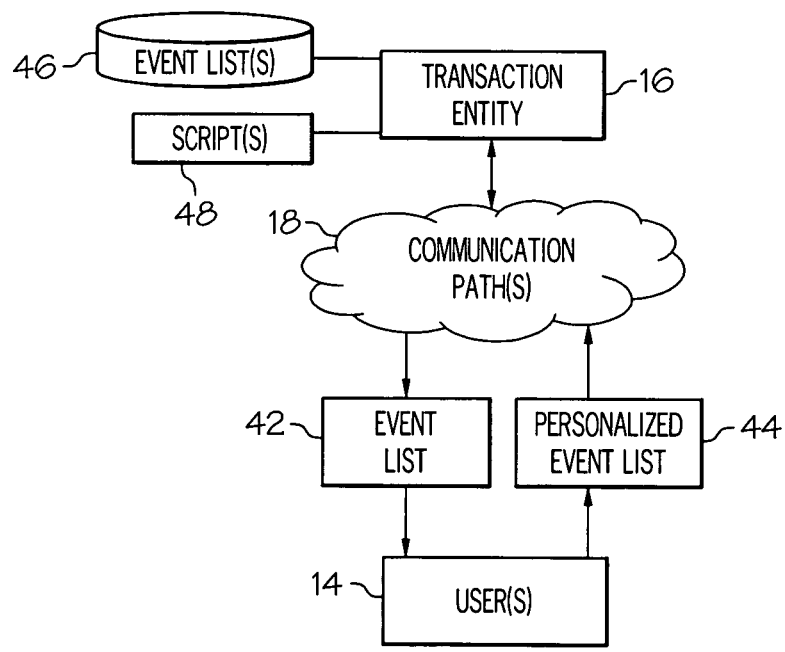
FIG. 12 is a block diagram illustrating a transaction entity providing an events list to a user to obtain information to be provided in event messages upon an occurrence of an event of one of the event types on the events list.

With reference to FIG. 12, the transaction entity 16 may provide one or more lists 42 of event types to a corresponding user 14. Each list 42 defines one or more event types that can be detected by the particular transaction entity 16. Each list may also include one or more default or suggested descriptions that can be provided as part of a corresponding event message 26. As noted above, the aggregating entity 12 may incorporate that description into an event indicator 30 corresponding to the event message 26. The use of a list 42 provides a way for the user 14 to associate specific information with event types of interest. Thus, the user 14 receives the list 42 and returns a response that comprises a personalized events list 44 that can include any combination of personalized or generalized messages that the particular user 14 may want to see incorporated into indicators 30 when viewing the aggregated indicators 30 in the account of the aggregating entity 12. That is, for the types of events that the user 14 wants the corresponding transaction entity 16 to report to the aggregating entity 12, the user 14 may accept one or more default descriptions and/or provide one or more personalized description from the list of event types provided to said user 14.

As an example, a transaction entity 16 such as a bank may provide a list 42 that includes transaction types such as withdrawals, deposits, checks written, etc. The list 42 may also include one or more default descriptions to be included in corresponding event messages 26.

As an example, the list 42 may comprise:
Withdrawals—"A withdrawal has occurred"
Deposits—"A deposit has been made"
Checks written—"A check has been processed"

The corresponding user 14 may opt to use the default messages in the event list 42, or the user 14 may customize one or more of the event types. For example, the user 14 may send back to the corresponding transaction entity 16, a personalized event list 44 as follows:
Withdrawals—"A withdrawal has occurred from our vacation account"
Deposits—"A deposit has been made to our vacation account"
Checks written—"A check has been written from our vacation account"

Further limitations and characterizations may also be used to distinguish transaction types, such as by dividing deposits into ranges based upon the deposit amount, e.g., all deposits over $1,000.00 may be characterized as a first event type, deposits $1,000.00 and under may be characterized as a second event type. As further examples, event types may be further characterized by dividing transactions based upon branch or location where the transaction occurred. Event types may also be based upon the day of the week, time, or any other desired criteria. Once the event types have been determined, the transaction entity 16 may statically store event descriptions for a particular user 14, e.g., in a database 46.

The transaction entity 16 may also dynamically generate descriptions for inclusion with event messages, e.g., by executing a script 48 or other software code. The script 48 may be used to generate an event message 26 and may further partially or completely automate the tasks of the transaction entity 16, e.g., by transmitting the event message 26 to the aggregating entity 12. Still further, event descriptions may be generated by a combination of using dynamically generated and statically stored information, e.g., by using rules, expressions and exceptions specified by the user 14 to modify or select a description and/or type of event.

For example, a user 14 may specify a base description "Deposit made" to correspond with an event type such as a bank deposit. If a deposit is made into the user's bank account, the script 48 may generate an event message 26 that includes a token 24. The script 48 also looks at the amount of the deposit. The script 48 may execute a rule that asserts if the deposit is relatively small, e.g., as defined by the user 14, then the script 48 includes with the event message 26, a modified version of the base description, e.g., the event message may further include the description "Small deposit made". Correspondingly, if a deposit into the user's bank account is relatively large, e.g., as defined by the user 14, the script 48 may include the modified description "Large deposit made".

Analogously, the user 14 may define a first type of event as a small deposit and a second type of event as a large deposit, where "small" and "large" are relative terms defined by the particular user 14. Correspondingly, the user 14 may associate the description "Small deposit made" for events of type small deposit, and the user 14 may associate the description "Large deposit made" for events of type large deposit. Thus, a rule, expression or exception may be used to identify the occurrence of a particular event, e.g., a large deposit, by identifying that a deposit was made, then by distinguishing whether the deposit was small or large based upon some user defined preference that defines the distinction between small and large deposits.

As noted in greater detail herein, the definition of "sensitive information" may vary from event to event, or may evolve over time. Moreover, the level of sensitive information may change from transaction entity 16 to transaction entity 16, e.g., depending upon how discrete, covert, private, sensitive, etc., a corresponding event is. Thus, a description of an event of interest included in an event message 26 may provide generic or standardized references to transactions. Some examples of generic or standardized references to transactions may include "Deposit Made", "Withdraw Made" or "Stock Sold". A description of an event of interest included in an event message 26 may also include some amount of specific information. Examples of references to transactions including some specific information may include "Large Withdraw Made", "Bank Deposit on Tuesday" or "Credit Card Use In Tampa FLA".

Such information may comprise a description of an occurrence of an event of interest, where the description does not provide the identity of the user 14 or a corresponding transaction entity 16 to the event of interest. For example, the information "Credit card used" does not particularly identity either the user 14 or the corresponding transaction entity 16. As another example, such information may comprise a description of an occurrence of a transaction without directly providing transaction attributes that describe the transaction. Transaction attributes may include information such as an account, amount of the transaction, balance or other financial information, password, required personal information such as social security number, driver's license number, etc.

With the above examples, events are characterized such that no sensitive information such as account numbers, amounts, identities of the parties or other personal information is disclosed. However, a user 14 that reviews the aggregated indicators 30 provided by the aggregating entity 12 may be able to identify an occurrence of fraud or misuse of a resource of the user 14. For example, if the user 14 did not approve a credit card transaction in Tampa Fla., then the general indication "Credit Card Use In Tampa FLA" is sufficient information to suggest that the user 14 investigate the matter further, as there is the potential for a misuse of a credit card maintained by that user 14.

There may be times where the disclosure of the identity of one or more of the parties, or where the amount or other transaction information is not deemed sensitive by either the user 14 or the corresponding transaction entity 16. Also, under certain circumstances, the identity of the transaction entity 16 may be disclosed, e.g., where the user 14 gave the same token to a plurality of credit card companies. As such, indicators may include "Credit card A used", "Credit card B used", "Credit card C used", etc., where A, B and C may represent actual names or coded representations of corresponding credit card companies.

As noted above, there may be times where even the general disclosure of an event is considered sensitive information. Under this arrangement, an event message 26 may include a token 24 without any corresponding descriptions of events. Alternatively, an event message 26 can comprise personalized information that encodes messages that are transmitted by an associated transaction entity 16 in an event message 26 and which correspond to an indicator 30 of an event of interest that is aggregated to the corresponding user account.

An example of a personalized description of an event of information may include information such as "I May Need An Umbrella Today". This encoded message does not identify the nature of the transaction, the user 14, the associated transaction entity 16, the value of any transaction or any sensitive data. However, the user 14, upon receipt of an aggregated indicator 30 that comprises that description, may immediately recognize this message as meaning that it is a good time to by a particular stock. Thus, the occurrence of the event, e.g., a good time to buy a stock, is identified to the user 14 without describing the nature of the event, e.g., information that may lead to a potential stock transaction.

The information "I May Need An Umbrella Today" is an innocuous label that represents or otherwise encodes the true nature of the event. The innocuous label may be personalized to encode information in a manner only understood by the user 14. Personalized indications, while requiring more user effort, will provide further security.

As another example, a user 14 provides one or more tokens 24 to each of two transaction entities 16, e.g., two banks. Assume that the user 14 has one account with each bank, and that the user 14 wishes to keep transactions with these two banks confidential. A first one of the banks is referred to as the North Bank and the second one of the banks is referred to as the South Bank. Also, assume that for each of the North Bank and South Bank, the user 14 and corresponding banks identify deposits and withdrawals as event types to be reported to a corresponding aggregating entity 12. The deposit event types are further broken down into deposits over $5,000.00 and deposits $5,000.00 and under. Similarly, withdrawal event types are further broken down into withdrawals over $1,000.00 and withdrawals $1,000.00 and under.

When a deposit of $5000 or less is made in the South Bank, the South Bank sends an event message 26 to the aggregating entity 12 that includes a token 24 and a personalized description of the event. In this example, the personalized description of the event may comprise contextually meaningless text such as "The bird in the South laid an egg". This description is contextually meaningless because it is unclear from the description alone, what actually occurred to trigger the event message 26. However, the significance of the description is known and understood by the user 14. If a deposit of more than $5000 is made in the South Bank, the South Bank may send an event message 26 to the aggregating entity 12 comprising a token 24 and a description of the event comprising contextually meaningless text such as "The bird in the South laid a big egg".

If a withdrawal of $1000.00 is made in the North Bank, the North Bank may send an event message 26 to the aggregating entity 12 comprising a token 24 and a description of the event comprising contextually meaningless text such as "An egg in North has hatched". If a withdrawal of more than $1000.00 is made from the North Bank, the North Bank may transmit an event message 26 to the aggregating entity 12 comprising a token 24 and a description of the event comprising contextually meaningless text such as "A jumbo egg in the North has hatched".

These descriptions, such as "An egg in North has hatched", even if nefariously intercepted, are likely meaningless to anyone except the user 14 and the corresponding transaction entity 16. Thus, even if someone were to observe or otherwise intercept the description of the event or the corresponding event message 26, there is no readily apparent sensitive information that has been disclosed. This allows, for example, a user 14 to log into a web site or other location hosted by the aggregating entity 12, and leave a connection to the web page visible on the screen without concern over divulging sensitive information based upon the interception of information corresponding to the indicators 30 appearing on the computer screen of the user 14, even if someone is physically observing the indicators right off the computer screen of the user 14.

A given event message 26 may also accumulate the description of several events before the event message 26 is sent to the aggregating entity 12. For example, a transaction entity 16 such as a bank may apply interest on a daily basis to a bank account of the user 14. However, the nominal nature of the interest accrual may not be of interest to the user 14. As such the bank may submit one event message 26 to the aggregating entity 12 per month that includes a summary, sum or other indication that that interest has accrued over the course of the month.

A given event message 26 may also accumulate the description of several different event types into a single event message 26 that is sent to the aggregating entity 12. For example, a user 14 may have a bank account set up, that is used exclusively for automated deposits and withdrawals. For example, a portion of the user's paycheck may be automatically deposited into this bank account. This bank account may also be used to make a car payment and mortgage payment where the monthly amounts are automatically withdrawn from the account. Under this arrangement, the user 14 may not want to micromanage this account. Thus, the bank may process a script that has a rule that considers whether an automatic paycheck deposit in a predetermined amount was received, and whether an automatic withdrawal from a mortgage company in a predetermined amount and an automatic withdrawal from a vehicle lender in a predetermined amount occurs. If the rule evaluates true, then the bank sends one event message with an indicator such as "All is well at home and on the road" to indicate that a series of typical and anticipated transactions occurred. Moreover, the event message 26 could include a plurality of separate descriptions, such as "Check Received", "Mortgage OK" and "Vehicle OK".

As yet another example, there need not be a one-to-one correlation between an event type and a description of an occurrence of an event. Rather, it is possible to implement one-to-many or many-to-one associations. As an example of a many to one association, a series of events of the same event type may include slightly different event descriptions that are included in corresponding event messages 26. Thus, any one of the descriptions: "The Apple Has Fallen From The Tree", "The Pear Has Fallen From The Tree" and "The Orange Has Fallen From The Tree" can all be used to identify an event of the same event type, e.g., a payment made for a recurring charge or a particular service. Each time an occurrence of recurring charge occurs, the transaction entity 16 prepares an event message 26 that includes a token 24 and a corresponding one of the variations of the above descriptions. Correspondingly, a one-to-many association may utilize the same description for a plurality of different event types or an event type from a plurality of different transaction entities. For example, an event message 26 may provide the description "ATM usage" in an event message 26 each time an automated teller transaction occurs, regardless of the bank location used for the transaction. Also, a plurality of event messages may all include a description such as "Deposit made" regardless of whether a deposit is made to a checking or savings account.

As yet another example, and as described in greater detail herein, the content of a description included in an event message 26 may be modified and/or defined by one or more rules, expressions or exceptions. For example, a transaction entity 16 may comprise a credit card company. Upon the occurrence of a credit card use, a rule may be established to utilize one of a plurality of different descriptions or modified versions of a base description depending upon the transaction. As an example, a transaction entity 16 may send an event message 26 to the aggregating entity 12 containing a token 24 and the description "The Kids Saw A Monkey At The Zoo" for purchases under a first predetermined dollar amount. The transaction entity 16 may send an event message 26 to the aggregating entity 12 containing a token 24 and the description "The Kids saw A Tiger At The Zoo" for purchases between the first predetermined dollar amount and a second predetermined dollar amount. The transaction entity 16 may send an event message 26 to the aggregating entity 12 containing a token 24 and the description, "The Kids Saw An Elephant At the Zoo" for purchases over a the second predetermined dollar amount.

The transaction entities 16 may also use expressions to select or otherwise modify information provided in event messages 26. The expression can be in any form decided upon between the user 14 and the corresponding transaction entity 16. As an example, a creditor transaction entity 16 and user 14 may agree that a Boolean expression is used to identify whether a payment was received by the creditor. The creditor may send an event message 26 to the aggregating entity 12 containing the description "The Sky Is Blue", a true expression, if the monthly payment sent from the user 14 to the transaction entity 16 was received and suitably processed. The creditor may send an event message 26 to the aggregating entity 12 containing the description "The Moon is Made Of Blue Cheese" if the creditor did not receive a payment from the user 14, or if there was a problem processing a payment by the user 14. The user 14 can then check to see what happened and resolve the situation. This example illustrates that the event message 26 need not be triggered as the result of an actual transaction. Rather, an event that triggers the transmission of an event message 26 may actually comprise the lack, omission, absence or failure of a transaction or other occurrence.

The transaction entity 16 may also send event messages 26 based upon exception processing. For example, a user 14 may only want to know when a balance in a specific account drops below a specified level, or when a single transaction exceeds a predetermined dollar amount with a specific transaction entity 16. Under such arrangements, the user 14 and corresponding transaction entity 16 may have established one or more exceptions. For example, an event message 26 may comprise a token 24 and the description "The Refrigerator Needs To Be Restocked" to let the user 14 know that a balance in a checking account has dropped below a predetermined level.

In certain circumstances, the event message 26 may further include a security credential or other identification mechanism sent by the service provider 16. The security credential may be used by either the user 14 or the aggregating entity 12 to verify the authenticity of the sender of the event message 26.

It may be that a transaction is not conducted directly with the corresponding user 14, yet an event message 26 may be generated and transmitted to corresponding aggregating entity 12 on behalf of the user 14. For example, if the user 14 enters a retail store and charges an item, an event message 26 may be generated by the retail store if that retail store is a corresponding transaction entity 16. More likely however, if a credit card is used which is from a credit card company not related to the retailer, e.g., the credit card company is an independent creditor, the retailer communicates at least some details of the transaction to the credit card company. The credit card company may be a transaction entity 16 and transmit an event message 26 to the aggregating entity 12.

The ability to transmit information to the aggregating entity 12 may be protected, e.g., by each transaction entity 16, through the use of varying degrees of security measures, depending upon the particular transaction entity 16. One such security measure comprises the use of a credentials vault. Essentially, the transaction entity 16 may form an audit trail or perform other tracking of persons and processes within their organization that trigger the transmission of event messages 26 to an aggregating entity 12 on behalf of a corresponding user 14. The audit trail may also track the information corresponding to descriptions, e.g., as derived from personalized event lists 44, the token(s) 24 and the address of the aggregating entity 12.

Figure 13:
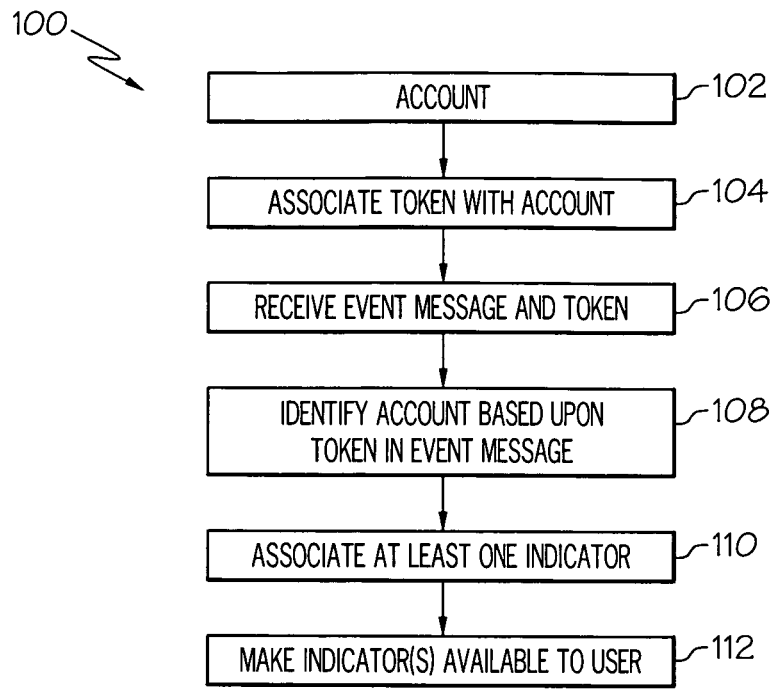
FIG. 13 is a flow chart for collecting indicators of events.

With reference to FIG. 13, a method 100 of collecting indicators of events is illustrated. An account is provided at 102 and the account is associated with a token at 104. The token is adapted to be distributed to at least one transaction entity. An event message comprising a token is received at 106 and an account is identified based upon the token received with the event message at 108. At least one indicator of an event of interest to a user is associated with the account at 110 based upon the received event message, and the indicator(s) associated with the account are made available to the user at 112.

Figure 14:
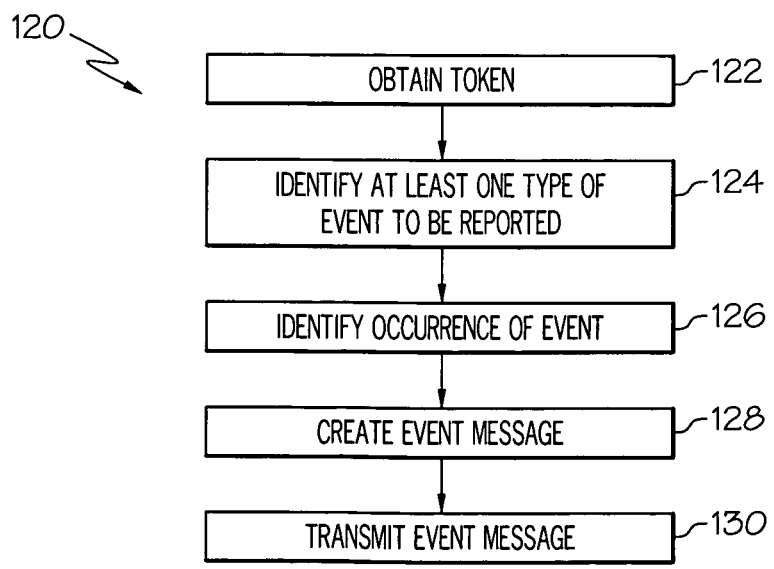
FIG. 14 is a flow chart for creating an event message associated with an event.

With reference to FIG. 14, a method 120 of creating an event message associated with an event is illustrated. A token that corresponds to an account of an aggregating entity is obtained at 122. At least one type of event of interest to a user is identified at 124. The identified types of events represent event types that are intended to be reported to the aggregating entity. As noted in greater detail above, the event types may be identified in a number of ways. The identified types of events may be specified by the user, transaction entity, aggregating entity, or any combination of the three. For example, the transaction entity or aggregating entity may provide a list of (standard) event types that the user may select from. The user may select desired event types from the list and/or augment the list with personalized or specific event types. Moreover, the user may augment event types which are standard or personalized, by specifying rules, expressions or exceptions that modify an event type. As an example, the user who is transacting with a stock broker may define a personalized event type as a purchase or sale of a specific stock or fund. The user may also augment an event type by specifying an event type as the value of any stock in a specific portfolio dropping by more than 20%, etc.

An occurrence of an event is identified at 126 as being one of the types of events that are intended to be reported to the aggregating entity and an event message is created at 128 in response to identifying the occurrence of the event of interest. The event message comprises at least the token. For example, as noted in greater detail herein, the event message may also optionally include a description of the event in addition to the token. At 130, the event message is transmitted to the aggregating entity. The event message is adapted to correspond to at least one indicator of the occurrence of the event that is reviewable by the user. As noted in greater detail herein, creating and transmitting an event message in response to identifying the occurrence of the event may occur concomitant with the event, or at some predetermined later time. For example, a transaction entity such as a credit card company may utilize a script to automate sending event messages each time a purchase using a credit card of the user is made. However, the same credit card company may send only one event message, e.g., at the end of each month, that summarizes a series of events such as the daily or otherwise periodic accrual of interest charges on an outstanding balance.

Figure 15:
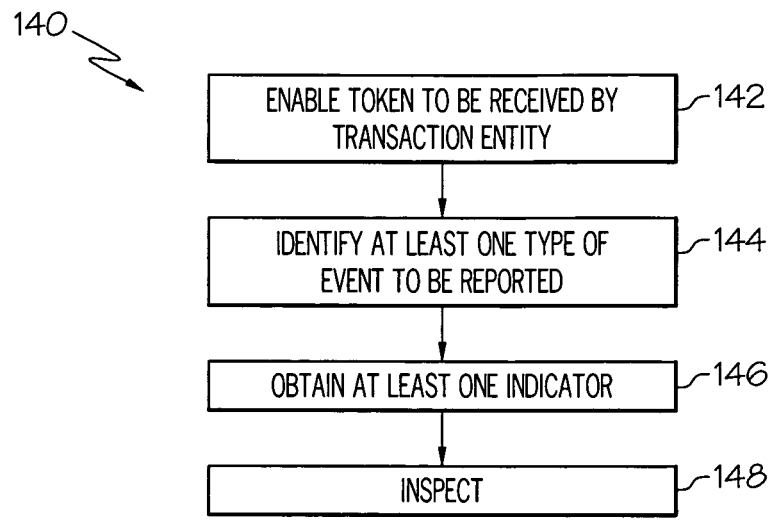
FIG. 15 is a flow chart for inspecting at least one indicator of an event.

With reference to FIG. 15, a method 140 of inspecting at least one indicator of an event is illustrated. A user enables a token to be received by a transaction entity at 142. The token corresponds to an account of an aggregating entity. The user enables the token to be received by the transaction entity for example, by obtaining one or more tokens from the aggregating entity or a third party, or by generating one or more tokens, e.g., using a semipublic key, etc., and by distributing at least one token to the transaction entity. Alternatively, the user may enable token(s) to be received by a transaction entity by allowing the transaction entity to receive at least one token from the aggregating entity or a third party. For example, the user may provide the transaction entity with the contact information and suitable account information of the aggregating entity so that the transaction entity can contact the aggregating entity directly for token(s).

At least one type of event is identified at 144 that is to be reported to the aggregating entity. At least one indicator is obtained from the account of the aggregating entity at 146 and the obtained indicator(s) are inspected at 148. The obtained indicator(s) are adapted to be created by the aggregating entity based upon an event message received from the transaction entity, where the event message comprises the token, which is adapted to be used by the aggregating entity to identify the associated account and the event message corresponds to an occurrence of an event of at least one type of event of interest to be reported by the transaction entity to the aggregating entity.

Figure 16:
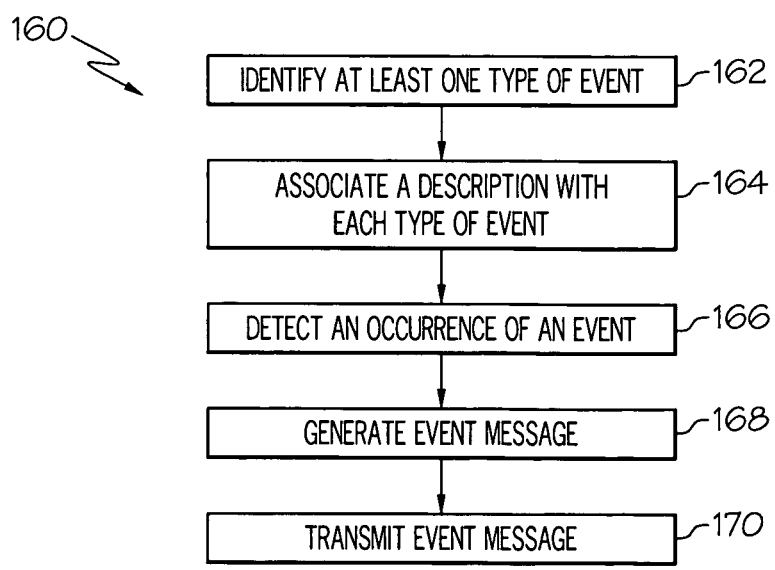
FIG. 16 is a flow chart for handling an event message associated with an event of interest.

With reference to FIG. 16, a method 160 of handling an event message associated with an event of interest is illustrated. At least one type of event which is of interest to a user is identified at 162. Each identified type of event corresponds to an event type that is to be reported by a transaction entity to an aggregating entity. A description is associated with each type of event at 164. Each description may comprise a default description, e.g., as defined by either the aggregating entity or corresponding transaction entity. Or the description may be provided by the user, e.g., as a personalized description as set out in greater detail herein. An occurrence of an event that is an identified type of event is detected at 166, and an event message is generated at 168. The event message comprises a token that associates the user with an account maintained by the aggregating entity and the description that is associated with the identified type of event corresponding to the detected occurrence of the event. The generated event message is transmitted to the aggregating entity at 170.

While the aggregating entity 12, the user 14 and transaction entity 16 may be conceptually, logically and functionally distinct, each need not be. For example, if the user 14 is a corporation, a transaction entity 16 may comprise a branch, division, regional office, etc., of the corporation. Moreover, the aggregating entity may be maintained, run and supported by the corporation without requiring a per se third party.

For purposes of clarity of discussion herein, certain examples set out in the specification are directed to a single user 14 along with transaction entities 16 associated with that user 14. However, in practice, multiple users 14, each having the same or different transaction entities 16 will interact with the same aggregating entity 12.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

Other computer system configurations can also be employed to perform the systems and methods herein, and to the extent that a particular system configuration is capable of performing a method herein, it is equivalent to the representative computer system and within the scope of this invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having thus described the invention of the present application in detail and by reference to preferred embodiments thereof, it will be apparent that modifications and variations are possible without departing from the scope of the invention defined in the appended claims.

What is claimed is:

1. A method comprising:
   associating, by an aggregating server, a plurality of private keys and a plurality of corresponding public keys with a plurality of user accounts;
   communicating, by the aggregating server via a network, a first public key from the plurality of public keys to a device associated with a user account from the plurality of user accounts;
   receiving, by the device, the first public key from the aggregating server;
   generating, by the device, a plurality of tokens based on the first public key;
   transmitting, by the device, the plurality of tokens to a plurality of transaction entities associated with the user account;
   receiving, by the aggregating server from a first transaction entity of the plurality of transaction entities, via the network, a first event message comprising a first token;
   determining, by the aggregation server, that the first token was not previously used by the first transaction entity;
   determining, by the aggregating server, based on the determining that the first token was not previously used by the first transaction entity and using the plurality of private keys, that the first token was generated using the first public key;
   determining, by the aggregating server, based on the first token, a first event description for the first event message;
   generating, by the aggregating server, a first event indicator comprising the first event description for the first event message;
   deriving, by the aggregating server, from a plurality of event types, a first event type associated with the first event message;
   receiving, by the aggregating server, from a second transaction entity, a second event message comprising a second token;
   generating, by the aggregating server, a second event indicator based on the second event message, wherein the second event indicator is associated with the first event type;
   compiling, by the aggregating server, a group of event indicators associated with the first event type, wherein the group of event indicators comprises at least the first event indicator and the second event indicator;
   receiving, by the aggregating server, login information associated with the user account; and
   presenting, by the aggregating server, the compiled group of event indicators on the device associated with the user account, based on receiving the login information.

2. The method of claim 1, further comprising:
   providing, by the aggregating server, an interface on the device associated with the user account, wherein the interface provides at least one of viewing, filtering, querying, searching, sorting, printing, downloading, or deleting the compiled group of event indicators, to a user associated with the user account.

3. The method of claim 1, further comprising:
   determining that the first token was previously used by the first transaction entity; and
   disregarding the first event message, based on the determining that the first token was previously used by the first transaction entity.

4. The method of claim 1, wherein the first event description is determined further based on the determining the first token was generated using the first public key.

5. The method of claim 1, wherein the first transaction entity comprises a bank.

6. The method of claim 1, further comprising:
   decrypting, by the aggregating server, the first token using a first private key corresponding to the first public key; and
   generating a first token value, based on the decrypted first token.

7. The method of claim 6, wherein the first event type is derived further based on the first token value.

8. The method of claim 1, wherein generating the plurality of tokens comprise:
   encrypting, by the device, a plurality of token values using the first public key.

9. A system, comprising:
   an aggregating server comprising one or more first hardware processors and a first non-transitory memory storing first instructions that when executed by the one or more first hardware processors cause the one or more first hardware processors to perform first operations comprising:
      associating a plurality of private keys and a plurality of corresponding public keys with a plurality of user accounts; and
      communicating, via a network, a first public key from the plurality of public keys to a device associated with a user account from the plurality of user accounts; and the device comprising one or more second hardware processors and a second non-transitory memory storing second instructions that when executed by the one or more second hardware processors cause the one or more second hardware processors to perform second operations comprising:
receiving the first public key from the aggregating server;
generating a plurality of tokens based on the first public key; and
transmitting the plurality of tokens to a plurality of transaction entities associated with the user account;
wherein the first operations further comprise:
receiving, from a first transaction entity of the plurality of transaction entities, via the network, a first event message comprising a first token;
determining that the first token was not previously used by the first transaction entity;
determining, based on the determining that the first token was not previously used by the first transaction entity token by and using the plurality of private keys, that the first token was generated using the first public key;
determining, based on the first token, a first event description for the first event message;
generating a first event indicator comprising the first event description for the first event message;
deriving, from a plurality of event types, a first event type associated with the first event message;
receiving, from a second transaction entity, a second event message comprising a second token;
generating a second event indicator based on the second event message, wherein the second event indicator is associated with the first event type;
compiling a group of event indicators associated with the first event type, wherein the group of event indicators comprises at least the first event indicator and the second event indicator;
receiving login information associated with the user account; and
presenting the compiled group of event indicators on the device associated with the user account, based on receiving the login information.

10. The system of claim 9, wherein the first operations further comprise:
providing, by the aggregating server, an interface on the device associated with the user account, wherein the interface provides at least one of viewing, filtering, querying, searching, sorting, printing, downloading, or deleting the compiled group of event indicators to a user associated with the user account.

11. The system of claim 9, wherein the first operations further comprise:
determining that the first token was previously used by the first transaction entity; and
disregarding the first event message, based on the determining that the first token was previously used by the first transaction entity.

12. The system of claim 9, wherein the first event description is determined further based on the determining the first token was generated using the first public key.

13. The system of claim 9, wherein the first transaction entity comprises a credit card company.

14. The system of claim 9, wherein the first operations further comprise:
decrypting the first token using a first private key corresponding to the first public key; and
generating a first token value, based on the decrypted first token.

15. The system of claim 14, wherein the first event type is derived further based on the first token value.

16. The system of claim 9, wherein generating the plurality of tokens comprise:
encrypting a plurality of token values using the first public key.

* * * * *